(12) United States Patent
Lee et al.

(10) Patent No.: US 7,860,904 B2
(45) Date of Patent: *Dec. 28, 2010

(54) STANDALONE EXECUTION OF INCOMPLETE DATA FLOWS

(75) Inventors: Theodore Tak Lee, Issaquah, WA (US); Slobodan M. Bojanic, Redmond, WA (US); Anjan Kumar Das, Bellevue, WA (US); Grant Dickinson, Bellevue, WA (US); Mark Durley, Sammamish, WA (US); Jeff R. Bernhardt, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 716 days.

This patent is subject to a terminal disclaimer.

(21) Appl. No.: 11/848,039

(22) Filed: Aug. 30, 2007

(65) Prior Publication Data

US 2008/0270424 A1 Oct. 30, 2008

Related U.S. Application Data

(60) Provisional application No. 60/913,807, filed on Apr. 24, 2007.

(51) Int. Cl.
G06F 7/00 (2006.01)
G06F 17/30 (2006.01)
(52) U.S. Cl. .................... 707/810; 707/691
(58) Field of Classification Search .............. None
See application file for complete search history.

(56) References Cited

U.S. PATENT DOCUMENTS

| | | | |
|---|---|---|---|
| 5,197,137 A | 3/1993 | Kumar et al. | |
| 5,872,949 A | 2/1999 | Kikuta et al. | |
| 5,920,479 A | 7/1999 | Sojoodi et al. | |
| 6,044,211 A * | 3/2000 | Jain | 716/18 |
| 6,253,371 B1 * | 6/2001 | Iwasawa et al. | 717/150 |
| 6,339,775 B1 * | 1/2002 | Zamanian et al. | 707/999.101 |
| 6,389,587 B1 | 5/2002 | Lewis | |
| 7,065,634 B2 | 6/2006 | Lewis et al. | |
| 7,120,904 B1 | 10/2006 | Robison | |
| 7,139,779 B1 * | 11/2006 | Kornelson et al. | 707/999.203 |
| 2002/0095653 A1 * | 7/2002 | Parr et al. | 717/105 |
| 2004/0049477 A1 * | 3/2004 | Powers et al. | 707/1 |
| 2004/0123077 A1 | 6/2004 | Shebanow et al. | |
| 2004/0186915 A1 | 9/2004 | Blaszczak et al. | |
| 2004/0264383 A1 * | 12/2004 | Rudolph et al. | 370/252 |
| 2005/0055329 A1 * | 3/2005 | Bakalash et al. | 707/1 |
| 2005/0278152 A1 | 12/2005 | Blaszczak | |
| 2006/0010207 A1 * | 1/2006 | Akerman et al. | 709/205 |
| 2008/0270350 A1 * | 10/2008 | Bojanic et al. | 707/999.002 |

OTHER PUBLICATIONS

Haselden, Kirk, "Microsoft SQL Server 2005 Integration Services", Jul. 2006, Sams, pp. 419-560.*

(Continued)

Primary Examiner—Sathyanarayan Pannala
(74) Attorney, Agent, or Firm—Workman Nydegger

(57) ABSTRACT

Systems, devices, and methods for modularizing data flows and for providing stand-alone execution of incomplete data flows are provided based on an improved data warehousing framework. Data flow modularization and code reuse is improved through the use of the disclosed flowlets and allows for consistent and efficient standalone testing of incomplete data flows. The disclosed details enable various refinements and modifications according to system design considerations.

10 Claims, 20 Drawing Sheets

OTHER PUBLICATIONS

Michal Karczmarek. Constrained and Phased Scheduling of Synchronous Data Flow Graphs for Streamlt Language. Dec. 4, 2002 http://www.cag.lcs.mit.edu/commit/papers/02/karczma-thesis-SM.pdf. Last accessed May 11, 2007.

Joseph Tobin Buck. Scheduling Dynamic Dataflow Graphs with Bounded Memory using the Token Flow Model. http://ptolemy.eecs.berkeley.edu/publications/papers/93/jbuckThesis/thesis.pdf. Last accessed May 11, 2007.

Baifeng Wu, et al. A Concurrent Design Approach for Data Flow Dominated Embedded Systems. 0-7803-7941-1/03, 2003 IEEE http://ieeexplore.ieee.org/ieI5/9313/29613/01348979.pdf?isNumber=. Last accessed May 11, 2007.

Data Flow Features and Benefits. Pitney Bowes Group 1 Software. Http://www.g1.com/Products/Data-Integration/Data-Flow/Features-and-Benefits/ Wealth of Transformations, May 2007, pp. 1-3.

DataDefractor Overview.2007. Interactive Edge, LLC. Http://www.datadefractor.com, pp. 1-2.

Fuzzy Lookups and Groupings Provide Powerful Data Cleansing Capabilities 2005 http://msdn.microsoft.com/msdnmag/issues/05/09/sqlserver2005/default.aspx, pp. 1-6.

U.S. Appl. No. 11/848,054, filed May 21, 2010, Office Action.

* cited by examiner

STANDALONE EXECUTION OF INCOMPLETE DATA FLOWS

CROSS REFERENCE TO RELATED APPLICATIONS

This application claims priority to U.S. patent application Ser. No. 60/913,807, filed on Apr. 24, 2007, entitled "SYSTEMS AND METHODS OF MODULARIZING DATA FLOWS", the entirety of which is incorporated herein by reference.

TECHNICAL FIELD

The subject disclosure relates to data warehousing tools and more specifically to modularization and execution of reusable data flow components.

BACKGROUND

Data warehousing databases were developed to meet a growing demand for management information and analysis that could not be met by operational database systems. While operational systems are optimized for simplicity and speed of modification (e.g., online transaction processing) through heavy use of database normalization and an entity-relationship model, the data warehouse is optimized for reporting and analysis (e.g., online analytical processing). As a result, operational systems were unable to meet the need for management information for such reasons as the increased processing load of reporting, which negatively impacted the response time of the operational systems. Moreover, development of reports in operational systems often required writing specific computer programs, which was slow and expensive.

The critical factor leading to the use of a data warehouse is desire for a data analyst to be able to perform complex queries and analyses (e.g., data mining) on the information without slowing down the operational systems. There are many advantages to using a data warehouse such as the enhanced end-user access to a wide variety of data and increased ability of business decision makers to obtain various kinds of trend reports (e.g., the item with the most sales in a geographical area for the last two years). Advantageously, a data warehouse can be a significant enabler of commercial business applications, most notably customer relationship management applications.

A critical process in any data warehousing scenario is the Data Extraction, Transformation, and Load (ETL) Process. ETL involves such tasks as extracting data from outside sources, transforming it to fit business needs, and ultimately loading it into the data warehouse. While an ETL process can be created using almost any programming language, creating them from scratch is quite complex, requiring high levels of technical expertise, with little opportunity to reuse existing code bases. Increasingly, companies have been seeking ETL tools to help in the creation of ETL processes. One example of such a tool is MICROSOFT's SQL Server Integration Services (SSIS), which provides a platform to build data integration and workflow applications.

In SSIS, the core ETL functions are performed within 'Data Flow Tasks'. A Data Flow Task is an SSIS executable element responsible for transferring and transforming data between heterogeneous data sources. It is the most important among SSIS executable elements and it has its own complex logical structure with a specialized object model. A Data Flow consists of components and paths that connect the two. Together, paths and components build the data flow execution graph that controls the flow of data. The state of this graph is controlled by a module called data flow (or Pipeline) layout.

Accordingly, data flows in SSIS are built using components that define the sources that data comes from, the destinations that the data gets loaded to, and the transformations applied to data during the transfer. To be used in a dataflow, these source, destination, and transformation components have to be configured by defining the associated metadata. A complete data flow describes the flow of data by specifying one or more 'source' points that start the flow, operations downstream of the source points that operate on the data or direct the flow (e.g., merging or splitting the flow), and one or more destination points that 'sink' the data at the ends of the flow.

However, like previous data warehousing platforms, the existing SSIS data flow architecture does not offer the possibility of reusing parts of previously configured data flow components except through a crude copy and paste functionality. For example, the copy and paste functionality alone is not sufficient to address the reusability problem, because it does not offer any capability to manage pieces of reusable logic. Furthermore, even with the ability to copy and paste portions of reusable logic, additional remapping of metadata and manual fix-ups are still required, which does not mitigate the expense and required level of expertise to rapidly develop new data flows. Additionally, complex data flows could easily consist of hundreds of components. Currently, those components have to be placed within a single data flow and there is no way to group or modularize them.

Another problem with existing architectures is the inability to address data flow scenarios where only partial portions of the flow are known, such as in the case of a reusable logic portion for example. Such reusable logic portions can have one or more source or destination points that are unknown or are unavailable, can have one or more operations within the flow that are unknown, or any combination of these conditions. Such incomplete data flows cannot be executed on their own. For example, there is no convenient and consistent way to provide standalone execution of such incomplete data flows without significant effort to provide test input sources and output destinations or provide manual fix-ups.

Accordingly, in consideration of the complexity, costs, and high level of expertise required to reuse portions of ETL logic, it would be desirable to provide a convenient way to generate, manage, and reuse modular portions of dataflow logic. It is further desirable to provide a way for standalone execution such incomplete data flows. These and other deficiencies in the state of the art of data warehousing tools will become apparent from the description of the various exemplary non-limiting embodiments of the invention set forth below.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

In consideration of the foregoing, the invention provides an approach to generate and execute modular reusable data flow modules (hereinafter known as flowlets). In accordance with the embodiments described herein, flowlets can have one or more source or destination points that are unknown or are unavailable, can have one or more operations within the flow that are unknown, or they can have any combination of these conditions. Flowlets can address the above problems and can allow an iterative approach in building SSIS data flows, by allowing pieces of the data flow logic to be built and tested separately through a stand-alone execution process.

Furthermore, flowlets can consist of single or many data flow components configured to process data sets defined by its published metadata. These components can form a common logic that can be used and reused in many different data flows. The modular data flow design paradigm enabled by flowlets can further help standardize processes around designing and deploying ETL logic, allow central storage of flowlet libraries, and provides ease of maintenance. Furthermore, flowlets can be managed, deployed, executed, and tested with great flexibility and modularity in accordance with the disclosed embodiments to allow efficient and convenient reuse of portions of data flow logic.

According to one aspect of the invention, the SSIS data flow object model is modified and extended to support the use of flowlets.

According to a further aspect of the invention, a new type of a data flow designer is provided to present flowlet diagrams, create and edit flowlet definitions, and view associated flowlet information.

According to a further aspect of the invention, a new package type to hold the flowlet definitions is provided.

According to a further aspect of the invention, the new features enabled by the use of flowlet modules in the SSIS data flows can be blended in with the current data flow layout architecture to preserve existing objects and interfaces, while implementing new functionality by adding new flowlet components. Accordingly, new components (e.g., Flowlet Source, Flowlet Destination, Flowlet Reference and Flowlet Metadata Mapping) can be used to support flowlet-specific features. Additionally, new interfaces can expose new behavior of flowlet components to designers (e.g., a flowlet reference component can implement an additional interface to support connecting to flowlet definitions, caching, enumerating and refreshing the flowlet internals).

According to a further aspect of the invention, enhanced debugging and logging capability is provided to support the use of flowlets in data flows.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

BRIEF DESCRIPTION OF THE DRAWINGS

The systems and methods for modularizing data flows and standalone execution thereof are further described with reference to the accompanying drawings in which.

DETAILED DESCRIPTION

Overview

As discussed in the background, the SSIS core ETL functions are performed within 'Data Flow Tasks'. Data flows in SSIS are built using components that define the sources that data comes from, the destinations it gets loaded to, and the transformations applied to data during the transfer.

Figure 1A:
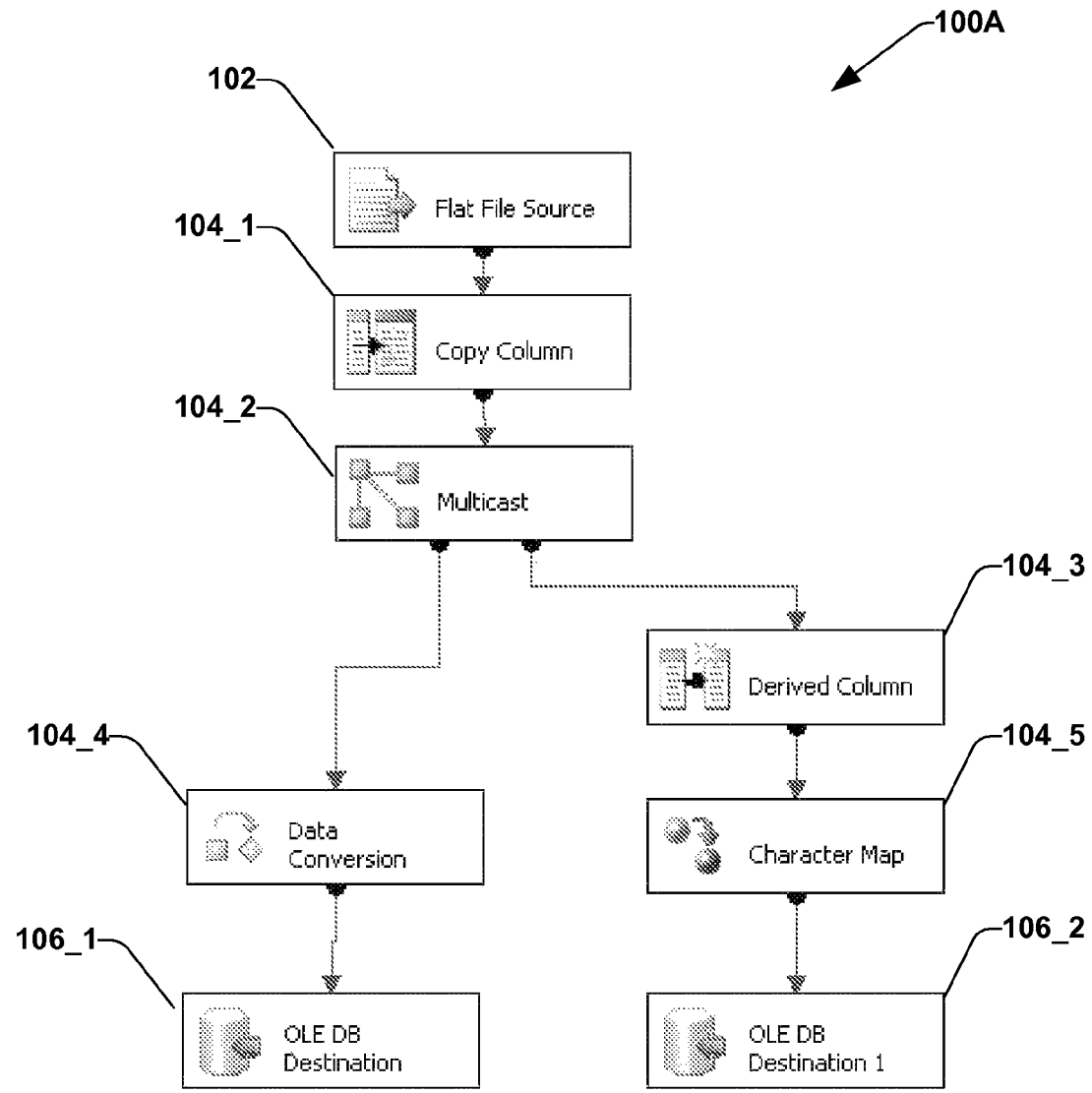
FIG. 1A illustrates an example of a complete data flow.
Figure 1B:
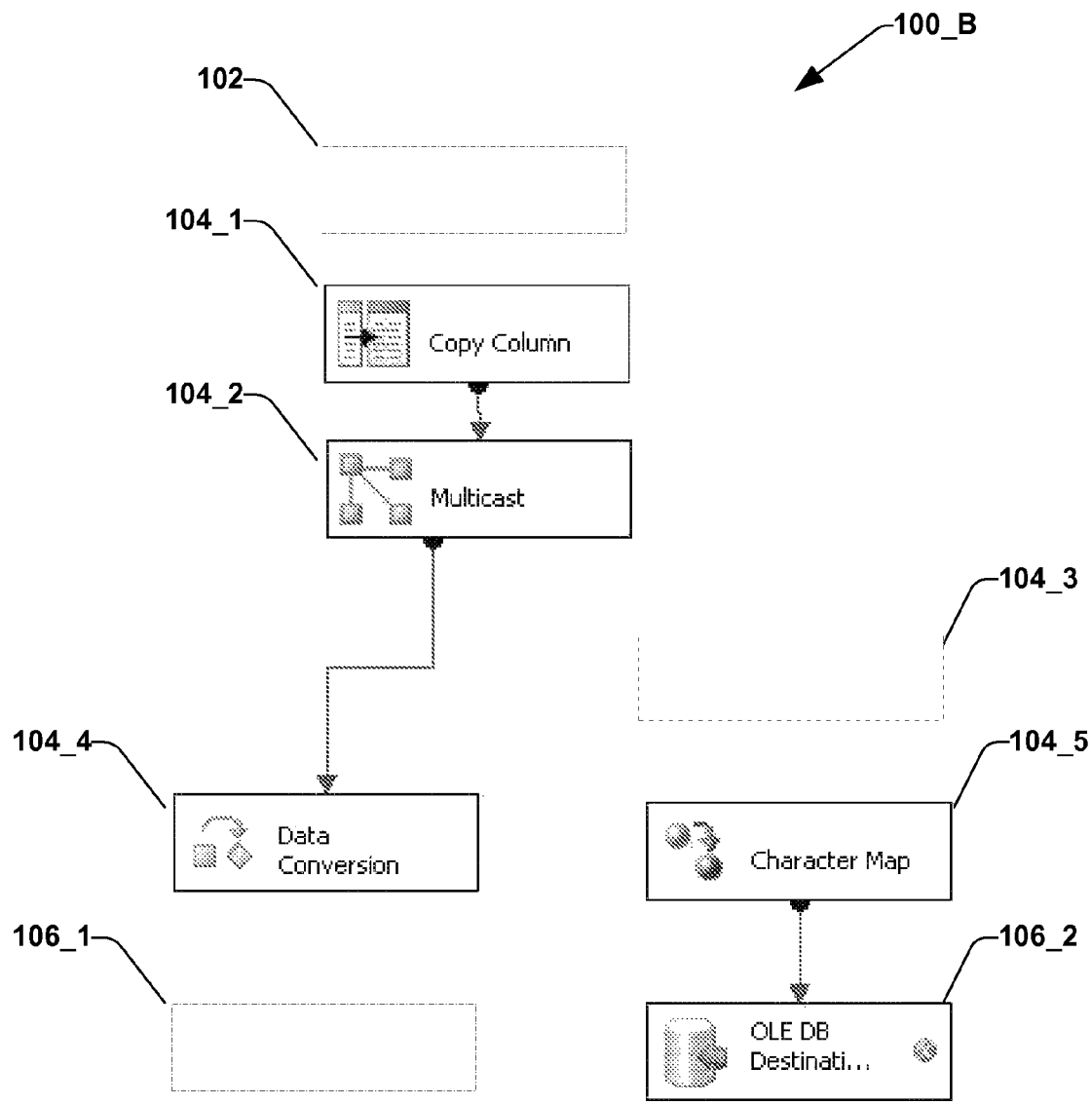
FIG. 1B illustrates an example of an incomplete data flow if one source point 102, one destination point 106_1 and one operation 104_3 from the complete data flow in FIG. 1A were not available.

Referring to FIG. 1A, an example of a complete data flow 100_A describes the flow of data by specifying one or more source points 102 that start the flow, operations 104_ downstream of the source points that operate on the data or direct the flow (e.g., merging or splitting the flow), and one or more destination points 106_ that 'sink' the data at the ends of the flow. Portions of the data flow (e.g., incomplete data flows, or Flowlets) can be formed from data flow scenarios where only partial portions of the flow are known, such as in the case of a reusable logic portion for example. Referring to FIG. 1B, such reusable logic portions 100_B can have one or more source 102 or destination 106 points that are unknown or are unavailable, can have one or more operations within the flow that are unknown 104_3, or any combination of these conditions (indicated by empty dashed-line blocks in FIG. 1B). Traditionally, such incomplete data flows cannot be executed on their own without accounting for the missing or unknown source points, destination points, and/or operations. As described in detail below, the invention provides special source and destination flowlet components to enable stand-alone execution of such incomplete data flows.

Figure 2:
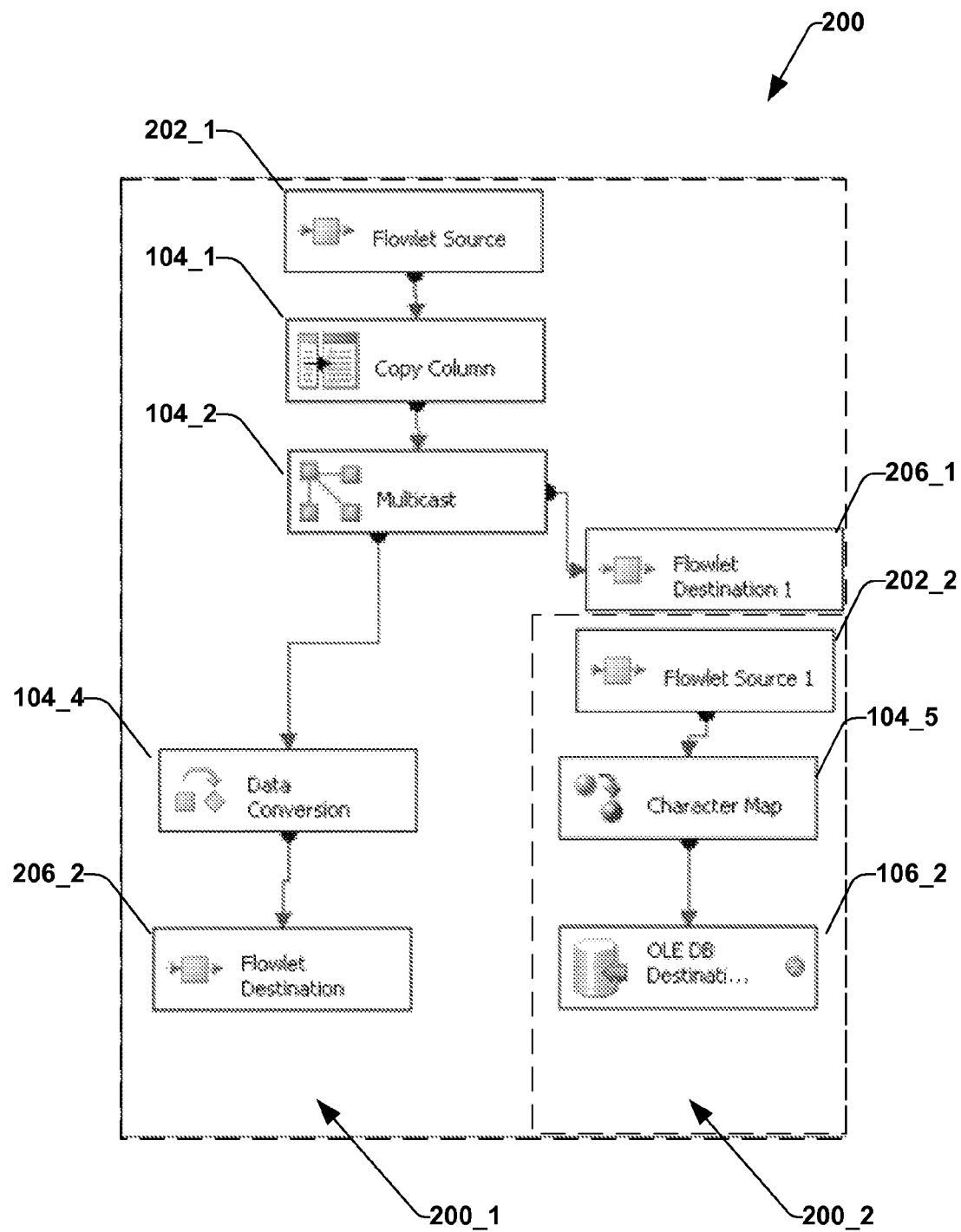
FIG. 2 illustrates an example of 2 flowlets 200_1 and 200_2 formed from the incomplete data flow in FIG. 1B using flowlet source 202_ and destination 206_ components.

FIG. 2 illustrates the use of special source and destination points, called flowlet source and destination components herein, according to one aspect of the invention. In the resulting modularized data flow, FIG. 2 illustrates an example of 2 flowlets (200_1 and 200_2) formed from the incomplete data flow in FIG. 1B using flowlet source component 202_1 in place of missing or unknown flat file source 102, and using flowlet destination components 206_2 in place of missing or unknown OLE DB destination 106_1. Unknown derived column operation 104_3 of FIG. 1B is replaced by a flowlet destination 206_1 and source component 202_2 pair.

Systems and Methods of Modularizing Data Flows

Figure 3:
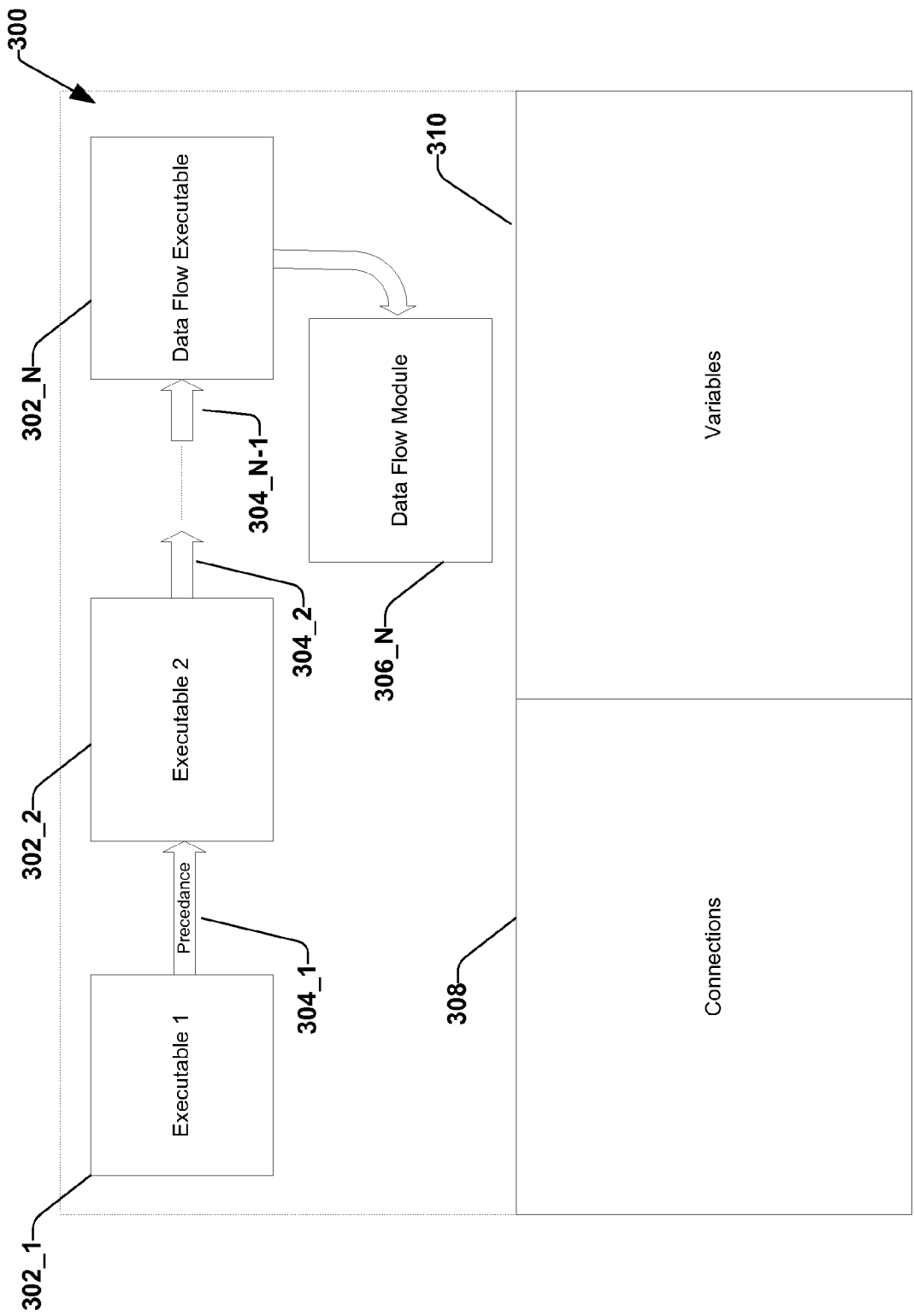
FIG. 3 illustrates an example of data flow execution of an SSIS package as provided without the use of flowlets.

FIG. 3 illustrates the execution flow of an SSIS package 300 without flowlets. The execution follows the list of executable elements 302_ and precedence constraints 304_ defined in the package 300. The executables can also be grouped in containers 306_ (e.g., sequences or loops) and they all have access to connection 308 managers (global entities) and variables 310, which can be global or scoped to appropriate containers.

Figure 4A:
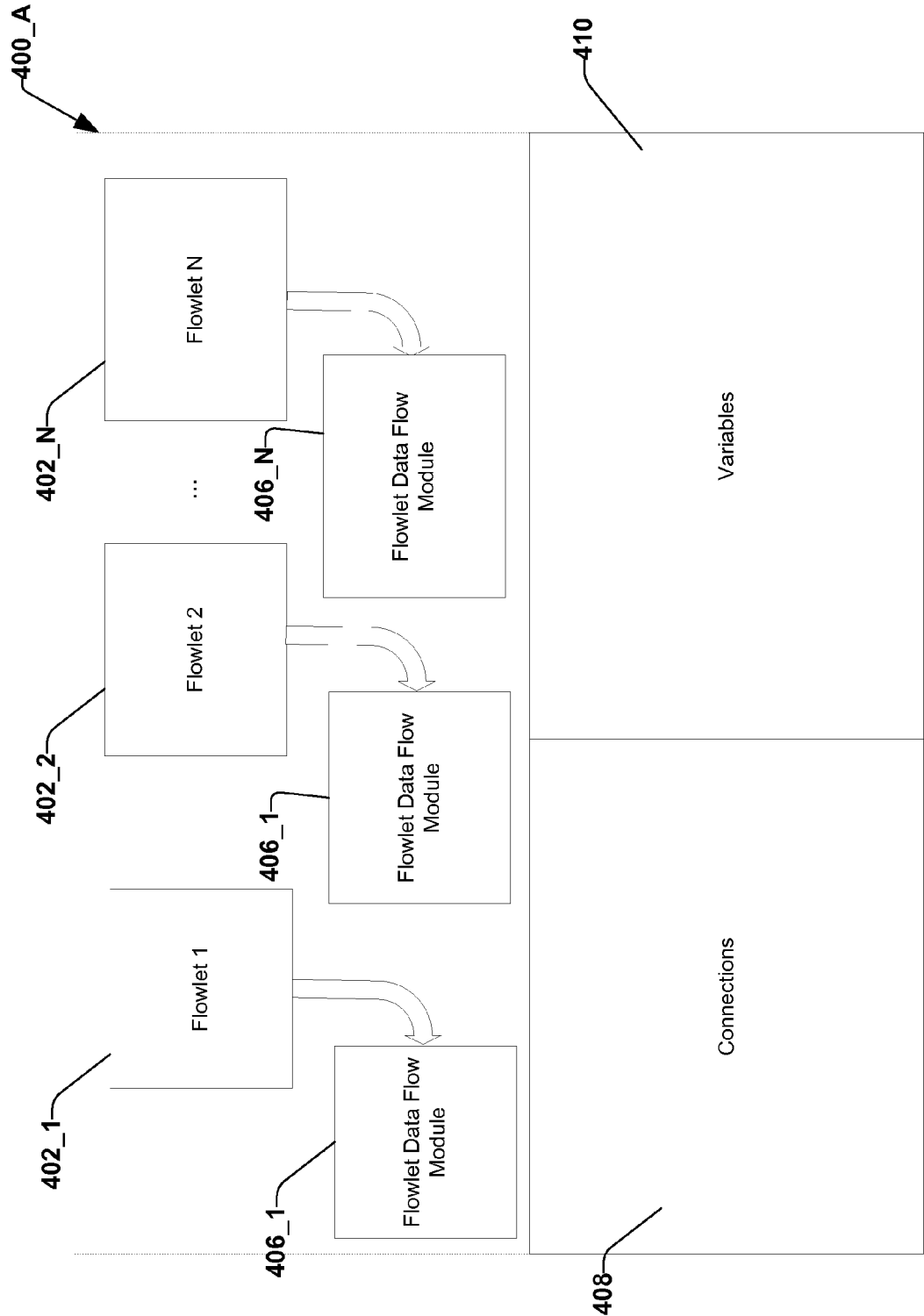
FIG. 4A illustrates an exemplary execution flow of a new SSIS package specialized to hold flowlet definitions according to one aspect of the present invention.

FIG. 4A illustrates an exemplary execution flow of a new SSIS package 400_A specialized to hold flowlet definitions according to one aspect of the present invention. The flowlet definitions 402_ can be held in a specialized SSIS package 400_A. The definitions itself are just as regular data flows except that at least one of its parts starts from a Flowlet Source component (202_ of FIG. 2) or at least one of its paths terminates on a Flowlet Destination (206_ of FIG. 2). The flowlet definition data flow 402_ contains at least one Flowlet Source or Flowlet Destination.

Figure 4B:
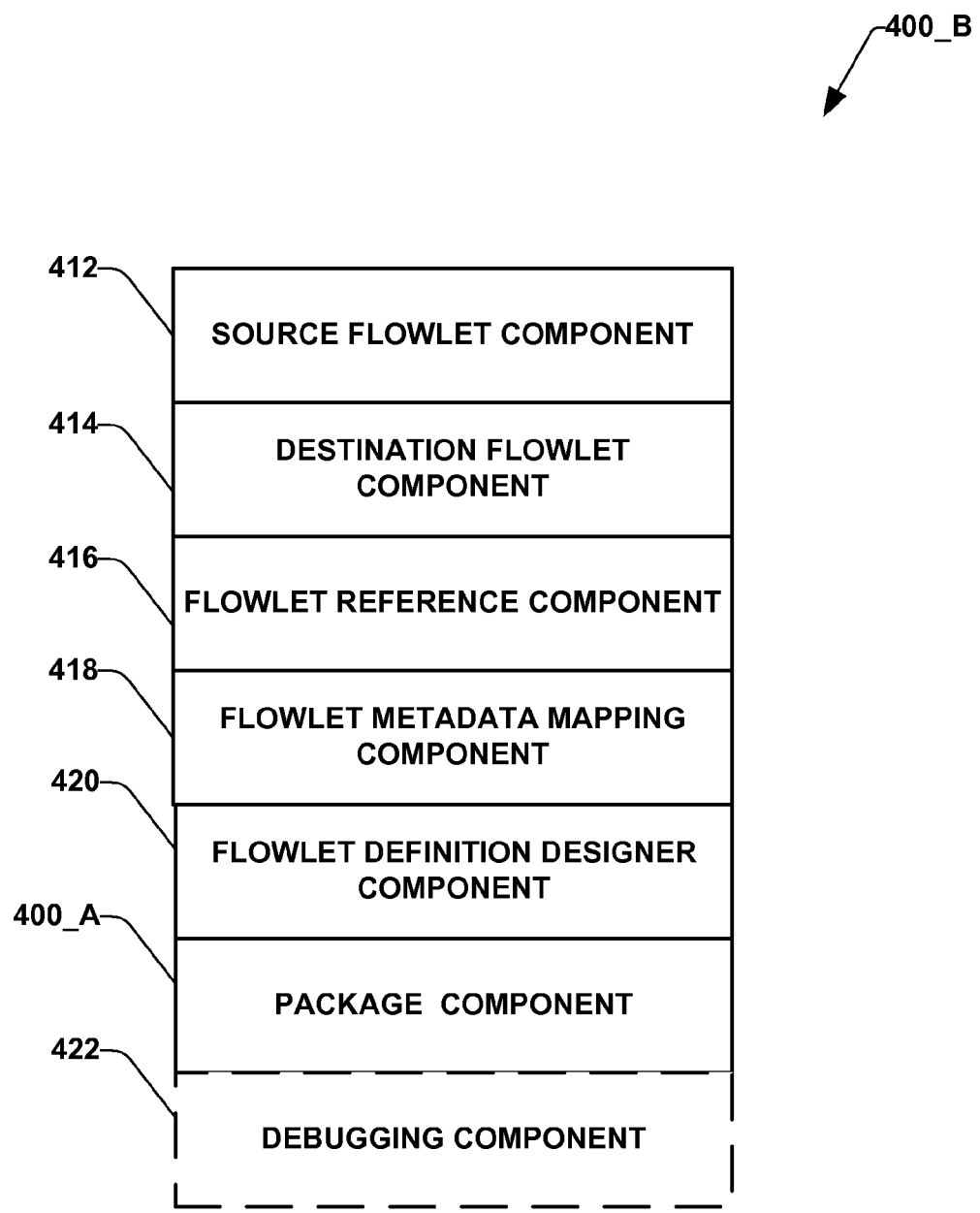
FIG. 4B illustrates an exemplary block diagram of a system for modularizing data flows according to one aspect of the present invention.

FIG. 4B illustrates an exemplary block diagram of a system for modularizing data flows according to one aspect of the present invention. In various non-limiting embodiments the system 400_B can include: a source flowlet component 412 configured to provide a functional data source in the data flow logic portion; a destination flowlet component 414 configured to provide a functional data destination in the data flow logic portion; a flowlet reference component 416 configured to link the data flow logic portion to one or more external data flows (not shown); a flowlet metadata mapping component 418 configured to map one or more of the inputs or outputs from the one or more external data flows by mapping source 412 and destination 414 flowlet component inputs or outputs to the flowlet reference component. In addition, the system can include a flowlet definition designer component 420 configured to enable at least one of the creation, editing, use, browsing, and a package component 400_A configured to hold a modularized data flow logic portion for at least one of modularized data flow development or deployment. The system can optionally contain other components as described more fully below. FIG. 4B shows one such optional component (e.g., the debugging component 422 shown in dashed lines).

Figure 4C:
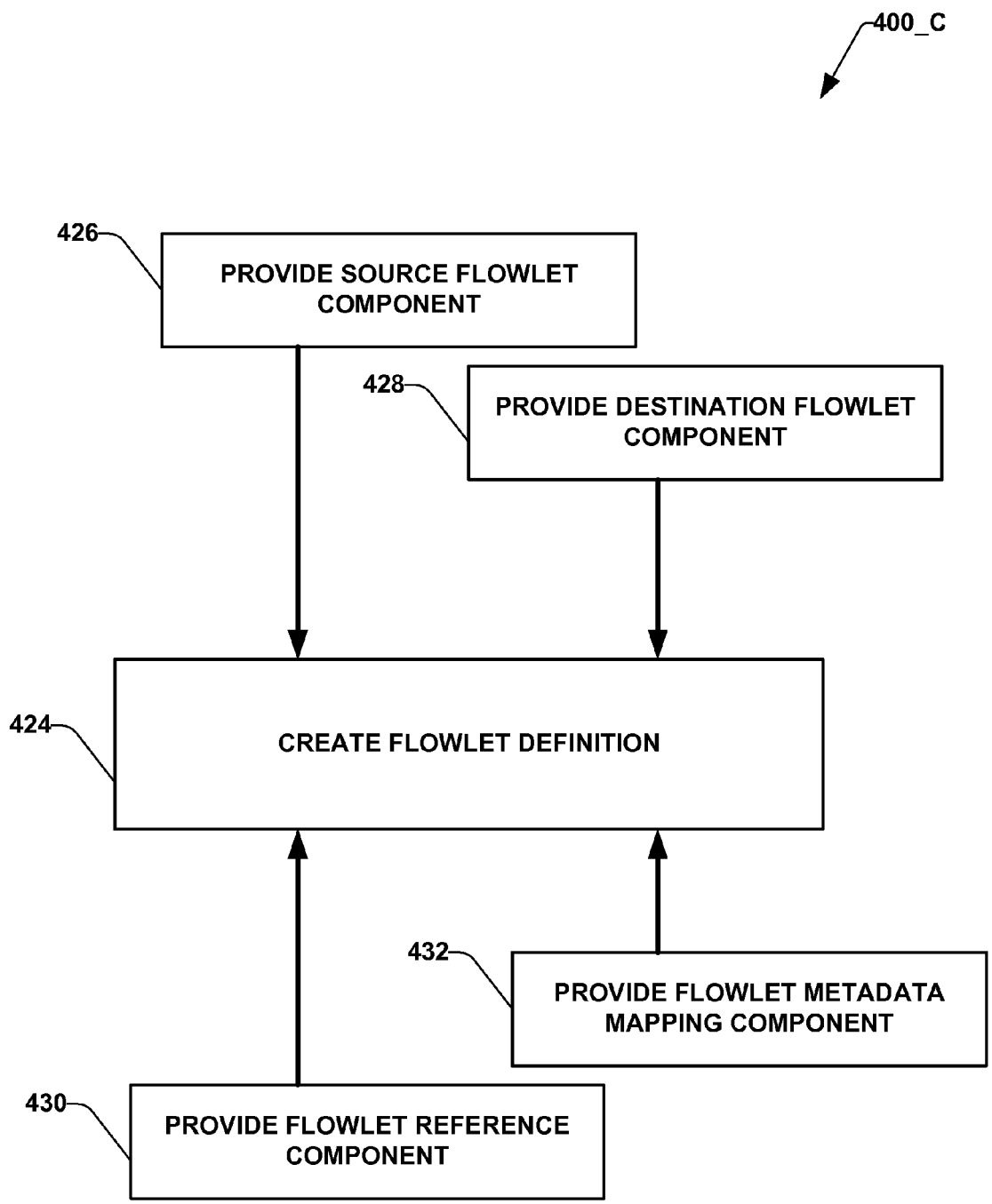
FIG. 4C illustrates an exemplary block diagram of a process for modularizing data flows according to one aspect of the present invention.

FIG. 4C illustrates an exemplary block diagram of a process for modularizing a data flow logic portion by creating a flowlet definition 424 according to one aspect of the present invention. The process can include: providing a source flowlet component 426 configured as a functional data source in the data flow logic portion; providing a destination flowlet component 428 configured as a functional data destination in the data flow logic portion; providing a flowlet reference component 430 configured to link the flowlet definition to one or more external data flows (not shown); and providing a flowlet metadata mapping 432 component configured to isolate boundaries of the flowlet definition logic from the one or more external data flows by mapping source 426 and destination flowlet component 428 inputs or outputs to the flowlet reference component.

Figure 4D:
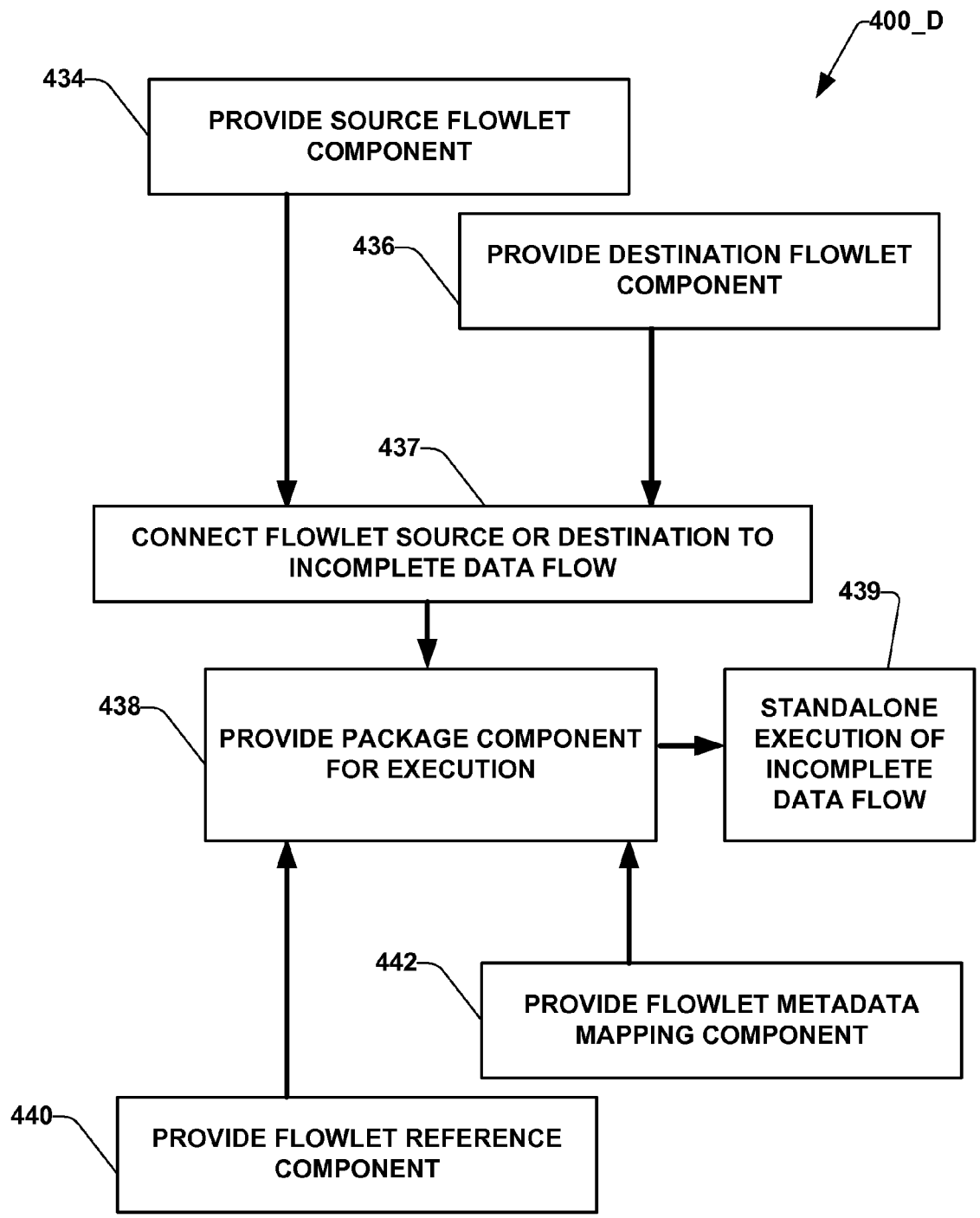
FIG. 4D illustrates an exemplary block diagram of a process for stand-alone execution of incomplete data flows according to one aspect of the present invention.

FIG. 4D illustrates an exemplary block diagram of a process for stand-alone execution of incomplete data flows according to one aspect of the present invention. The process can include: providing a source flowlet component 434 operably configured to be a functional data source in an incomplete data flow (not shown); providing a destination flowlet component 436 operably configured to be a functional data destination in an incomplete data flow; connecting one or more of flowlet source and destination components to the incomplete data flow 437; providing a flowlet reference component 440 configured to link a flowlet definition to one or more external data flows; providing a flowlet metadata mapping component 442 configured to map one or more of the inputs or outputs from one or more external data flows by mapping source and destination flowlet component inputs or outputs to the flowlet reference component; and providing a package component 438 operably configured to enable execution of the incomplete data flow.

Flowlet Definition Designer

According to one aspect of the invention, an improved data flow designer is provided to enable editing of flowlet definitions similar to the current SSIS data flow designer. However, additional capabilities are provided to design or create new flowlet definitions for all data flow constructs (e.g., components). In addition to providing access to the new Flowlet Source and Destination components, the data flow designer provides access to connection managers & variables to provide similar full-fidelity experience as the existing SSIS data flow designer. Moreover, the provided designer enables editing capabilities (e.g., modify) of existing flowlet definitions to change its behavior.

According to a further aspect of the invention, the new data flow designer provides the ability to execute flowlet definitions in separation (e.g., stand-alone execution) and show the execution progress.

Data Flow Components of Flowlet Definition Modules

According to one aspect of the invention, the use of such flowlet source and destination components as functional placeholders for unavailable source and destination points advantageously allows the flowlets to be executed and tested as stand-alone data flows. Furthermore, the flowlet source and destination components can serve as connection points, which provide the basis for allowing the stand-alone execution of the flowlet to be incorporated into other data flows. According to a further aspect of the invention, such stand-alone data flows can be connected together, as-is, by their respective flowlet source and destination components with other data flows.

Flowlet Source Component

According to one aspect of the invention, a Flowlet Source component is provided which has a single output. Output columns on the flowlet source output will define metadata of the columns entering the flowlet scope from the outer data flow. The flowlet source can produce sample data for the columns defined on it. The flowlet source is able to generate data for all available data types.

As described above, a flowlet source component feeds the data flow with data to start the execution at points of origin. According to a further aspect of the invention, developers of data flows can customize how data is generated by specifying different parameters. For example, parameters such as the number of rows (e.g., random or fixed) and nature of the data (e.g., random, fixed, or based on a range, sequence or trend that can approximate real or hypothetical data) can be specified.

Flowlet Destination Component

According to a further aspect of the invention, a flowlet destination component is provided which has a single input. The flowlet destination output will have metadata, of the columns generated inside the scope of a flowlet, and represented using the external metadata columns. These external metadata columns define a contract between a flowlet and an outer data flow when flowlet output columns are considered. These columns further provide for the case when this contract is defined before the inner flowlet logic is built. Furthermore, at execution time (flowlet definition execution), the flowlet destination will only absorb data generated upstream of it, according to one aspect of the invention.

Additionally, as described above, flowlet destination component 'sinks' data at the end points of the flow. According to a further aspect of the invention, developers of data flows can customize how the data gets consumed by specifying different parameters. For example, parameters such as drop data (e.g., the data is dropped from the data flow), row count (e.g., the number of data rows is counted and recorded), and dumped out (e.g., the data is written out to a file in a minimal fashion) can be specified.

Flowlet Reference Component

According to a further aspect of the invention, a Flowlet Reference Component is provided which is itself a link between the flowlet definition and a data flow it is used in. The flowlet reference component has the same number of inputs as the referenced flowlet definition has flowlet sources and it has the same number of outputs as the flowlet definition has flowlet destinations. Inputs on the flowlet reference component are mapped one to one with the flowlet sources inside the flowlet definition. The same is true for the flowlet reference outputs and flowlet destinations.

According to a further aspect of the invention, the flowlet reference component inputs have external metadata columns with the same metadata as output columns of a linked flowlet source from the flowlet definition. These external metadata columns can be used to map upstream output columns in the hosting data flow. Additionally, the external metadata columns of flowlet destinations can show up as output columns in appropriate outputs on flowlet reference components. Those columns can then be automatically made available for downstream mappings as if they were created by a regular component.

According to a further aspect of the invention, the instances of flowlets can have the notions of synchronous/asynchronous outputs similar to the real components.

According to a further aspect of the invention, the runtime connection collection on the reference component can be used to publish all the connections used internally in the flowlet definition to allow mapping of the connection managers defined in the external data flow to those defined inside the flowlet definition.

According to a further aspect of the invention, the flowlet reference component does not have any execution time behavior (e.g., it is ignored when execution paths are built).

According to a further aspect of the invention, the flowlet reference component can implement one or more additional interfaces to expose flowlet specific properties and behavior.

Flowlet Reference Interface

In addition to the regular component interfaces that the flowlet reference component implements, it can also expose an additional one or more interfaces specific to its behavior. For example, such an additional interface can provide services to load and cache flowlet internals, refresh loaded flowlet internals, persist flowlet internals, and extract selected components from the main flow for reasons such as turning them into flowlet definitions.

Flowlet Metadata Mapping Component

According to a further aspect of the invention, a Flowlet Metadata Mapping Component is provided to isolate boundaries of the flowlet logic from the outer data flow. Accordingly, the Flowlet Metadata Mapping Component can provide a necessary indirection to protect flowlet internals from the upstream changes in the main data flow and to protect the downstream components of the main data flow from changes in flowlet internals.

According to a further aspect of the invention, the same instances of inputs and outputs exposed on the mapping components can be made available as inputs and outputs on associated flowlet reference components. Accordingly, these components have one input and one output. The input contains both input and external metadata columns. The output contains output columns. Furthermore, mappings can also be defined between external metadata columns and output columns. As a result, these components are what flowlet sources and flowlet destinations can become when the content of a flowlet definition is loaded as a sub-graph under a flowlet reference component.

According to a further aspect of the invention, the Flowlet Metadata Mapping Component does not have execution behavior (e.g., it is ignored while building the execution paths). Moreover, the metadata mapping indirection that this component defines can be resolved at the time the execution paths are generated. The inner and outer column mappings can also be reconfigured at that time.

According to a further aspect of the invention, the data flow layout for both flowlet and regular data flow modules can include internal implementations of the components: Flowlet Source (202_ of FIG. 2), Flowlet Destination (206_ of FIG. 2), Flowlet Reference (605 of FIGS. 6C and 6D) and Flowlet Metadata Mapping component (622 and 628 of FIG. 6D). Furthermore, Flowlet Metadata Mapping component 622 can be implemented either as a separate entity, or it can be built by transforming the Flowlet Source (e.g., adding an input to it) or Flowlet Destination (e.g., adding an output to it). Additionally, the Flowlet Reference component 605 can have a placeholder for data flow sub-graphs with components and paths loaded from associated flowlet definitions.

Modularizing Data Flows by Extraction of Portions of an Existing Data Flow

Figure 5A:
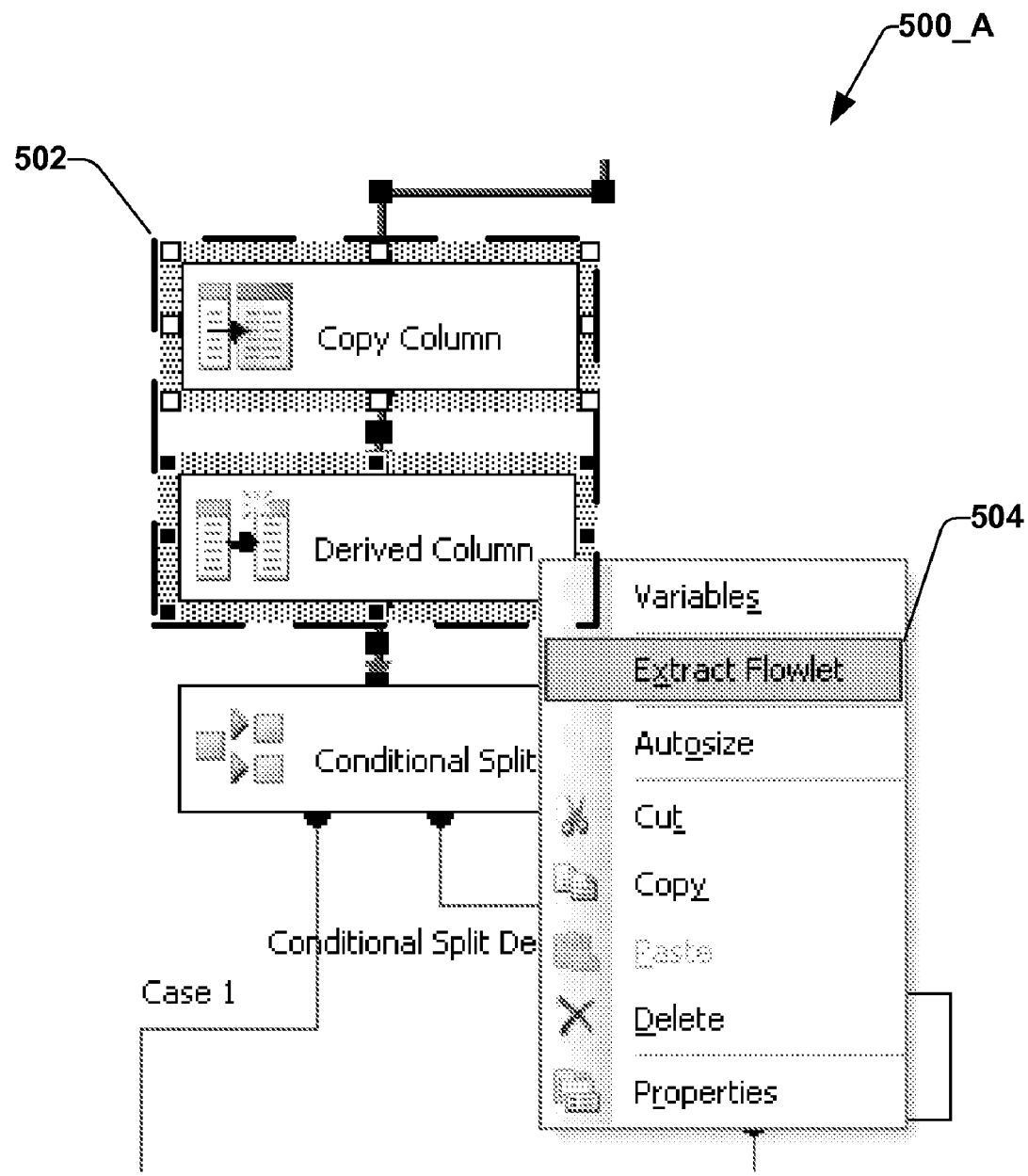
FIG. 5A illustrates an exemplary data flow designer procedure of selecting and extracting existing components in an existing data flow.

According to one aspect of the invention, a method of creating a modularized data flow by extracting portions of an existing SSIS data flow into a flowlet definition module is provided. To extract a portion of an existing SSIS data flow, the process begins by selecting the components to extract at 502 in the provided data flow designer 500_A as illustrated in FIG. 5A and issuing an extract flowlet command 504.

Figure 5B:
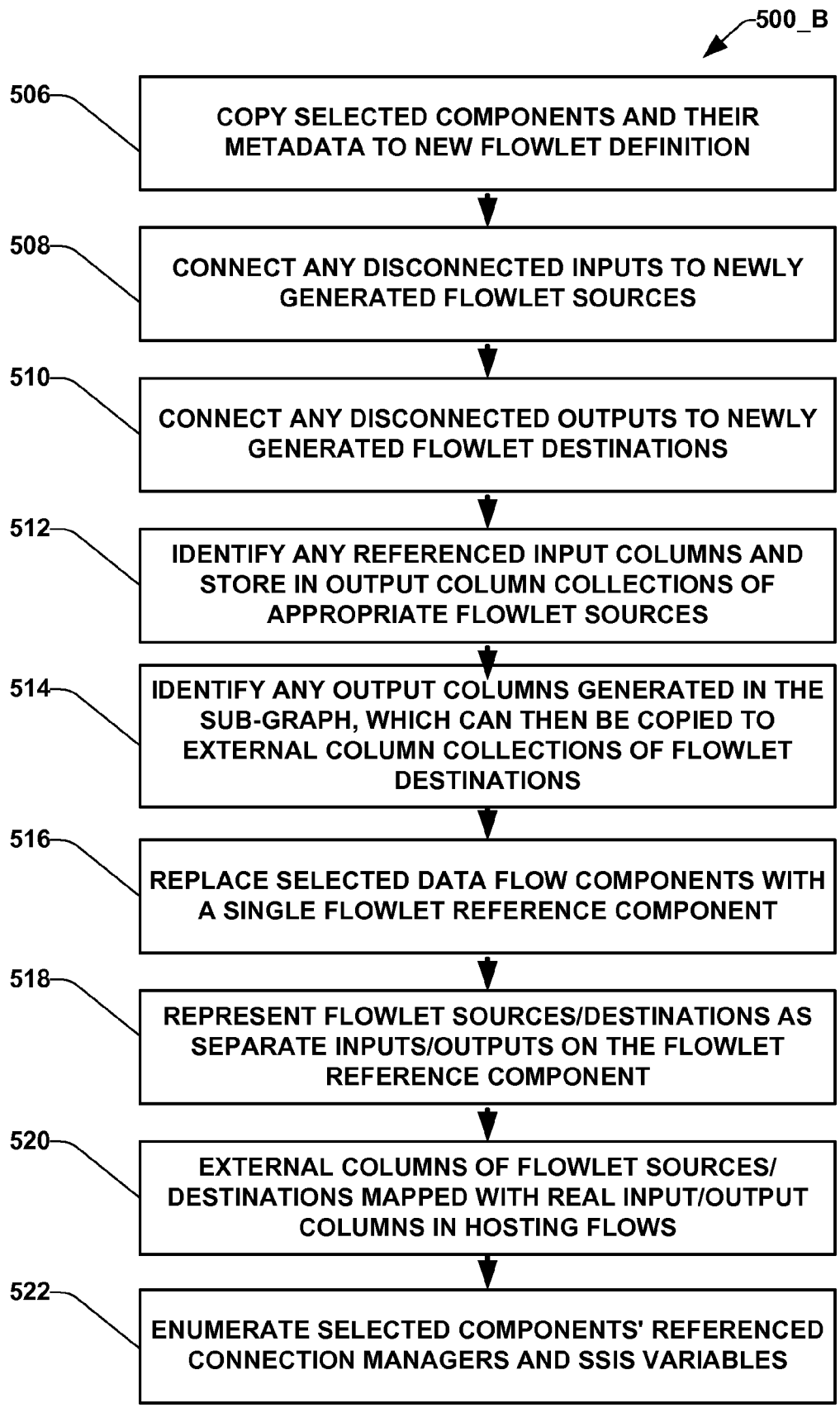
FIG. 5B illustrates an exemplary non-limiting block diagram of a process to modularize a data flow from a portion of an existing SSIS data flow.

FIG. 5B illustrates an exemplary non-limiting block diagram 500_B of a process to create the modularized data flow by extracting portions of an existing SSIS data flow into a flowlet definition module. At 506, all selected components with their metadata can be copied to a newly generated flowlet definition. At 508, all disconnected inputs can be connected to newly generated flowlet sources. All disconnected outputs can be connected to newly generated flowlet destinations at 510. If necessary, at 512, the selected sub-trees are walked downstream starting from disconnected inputs to identify referenced input columns, which can then be stored in output column collections of appropriate flowlet sources. Likewise at 514, if necessary, the sub-trees can be walked upstream from disconnected outputs to identify outputs columns generated in the sub-graph, which can then be copied to external column collections of flowlet destinations. At 516, the selected data flow components are replaced with a single flowlet reference component. All flowlet sources can then be represented as separate inputs on the flowlet reference and all flowlet destinations can then be turned into outputs at 518. Additionally, at 520 their external columns can be automatically mapped with real input/output columns in hosting flows. Advantageously, the configuration of selected sub-flows can automatically determine whether flowlets are synchronous or asynchronous. At 522, the connection managers and SSIS variables referenced in the selected components can then be enumerated on the flowlet reference component, which can serve as placeholders where real entities in the original data flow can be mapped to the corresponding elements inside the flowlet definitions.

Although creation of modular data flows from existing data flows using the method above represents one aspect of the invention, it should be apparent that the data flow designer provided by the invention enables the creation of such modularized data flows from scratch as indicated above. Furthermore, one skilled in the art would recognize other methods of creating modular data flows according to the framework and concepts disclosed herein. As such, the invention should not be limited to the disclosed embodiments.

To illustrate an example of the method described above, FIG. 6A illustrates an exemplary simple data flow and the layout of columns that the data flow processes. The data flow 600_A consists of the Source component 602_A (which produces 4 columns; A (610), B (612), C (614), and D (616)), Transform 1 (604) (which references column A and produces column E (618)), Transform 2 (606) (which references B and produces F (620)) and the Destination component 608_A (which consumes all the columns generated upstream; e.g., A, B, C, D, E and F). FIG. 6B illustrates an exemplary flowlet definition diagram created by extracting components Transform 1 (604) and Transform 2 (606) of FIG. 6A.

In FIG. 6B, the Flowlet Source 602_B produces only the columns extracted components (Transform 1 (604) and Transform 2(606)) consumed. Similarly, the Flowlet Destination 608_B only consumes columns E and F (618 and 620) (e.g., the ones generated by the extracted components). As a result, the Flowlet Destination 608_B has external metadata columns that match metadata of E and F columns (618 and 620), and to which upstream columns can be mapped. For the case in FIG. 6B, Transform 1 and Transform 2 are shown as synchronous components. However for the asynchronous case, only the "pass through" columns (C/D (614/616) on FIG. 6A and A/B (610/612) on FIG. 6B) would be terminated for asynchronous components. FIG. 6C illustrates an exemplary Flowlet Reference component 605 formed by the extracted components of FIG. 6A according to the process of FIG. 5B. For example, FIG. 6C shows how extracted components (Transform 1 (604) and Transform 2 (606) of FIGS. 6A and 6B) are replaced by the Flowlet Reference component (605 of FIG. 6C). FIG. 6C shows that Flowlet Reference can behave as an aggregator of extracted components as far as the usage of column metadata is considered.

Caching of Flowlet Definitions in Hosting Data Flows

According to one aspect of the invention, before a data flow that references flowlets can be executed, internals of referenced flowlets have to be cached somewhere in the main flow. Accordingly, the internal components and paths can be stored in separate flowlet containers that can be made accessible only through flowlet references 605. The cached components can be further used to expand the execution paths so they can represent the entire data flow the same way as if the flowlet logic is incorporated inline in the main data flow. The SSIS data flow execution engine thus behaves the same way as if it deals with a single monolithic data flow.

Figure 6A:
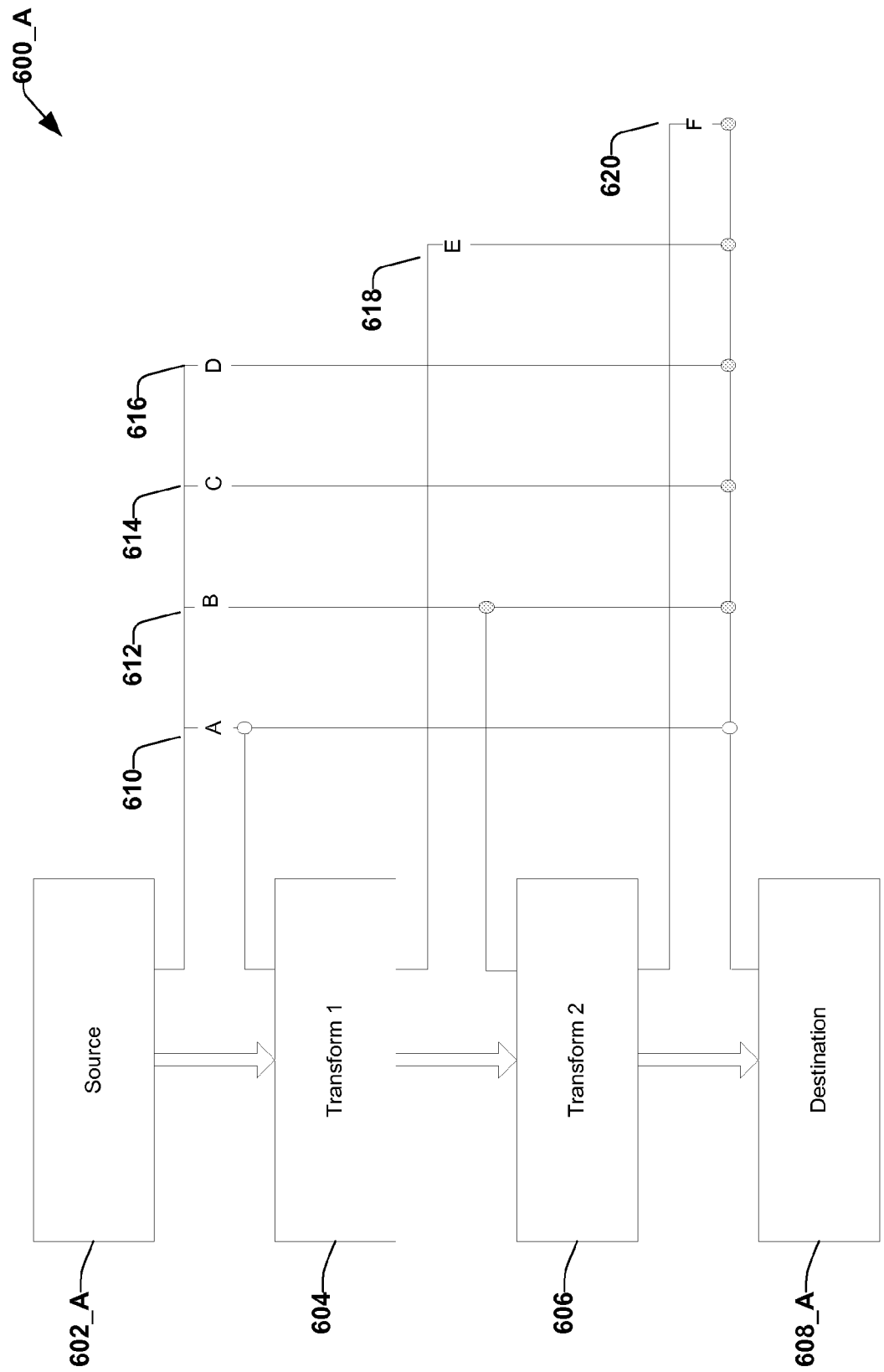
FIG. 6A illustrates an exemplary simple data flow and the layout of columns it uses.
Figure 6B:
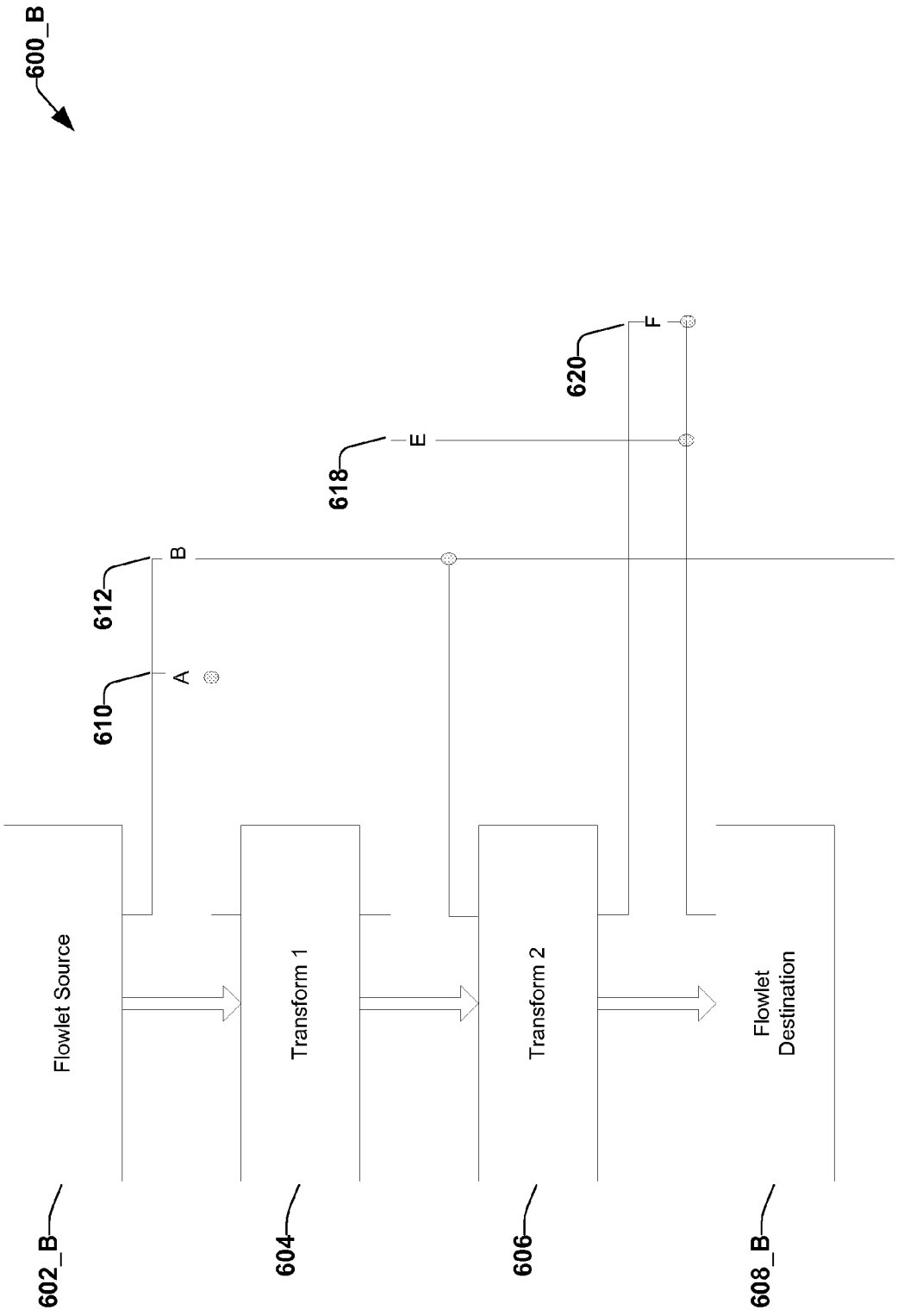
FIG. 6B illustrates an exemplary flowlet definition diagram created by extracting components Transform 1 (604) and Transform 2 (606) of FIG. 6A.
Figure 6C:
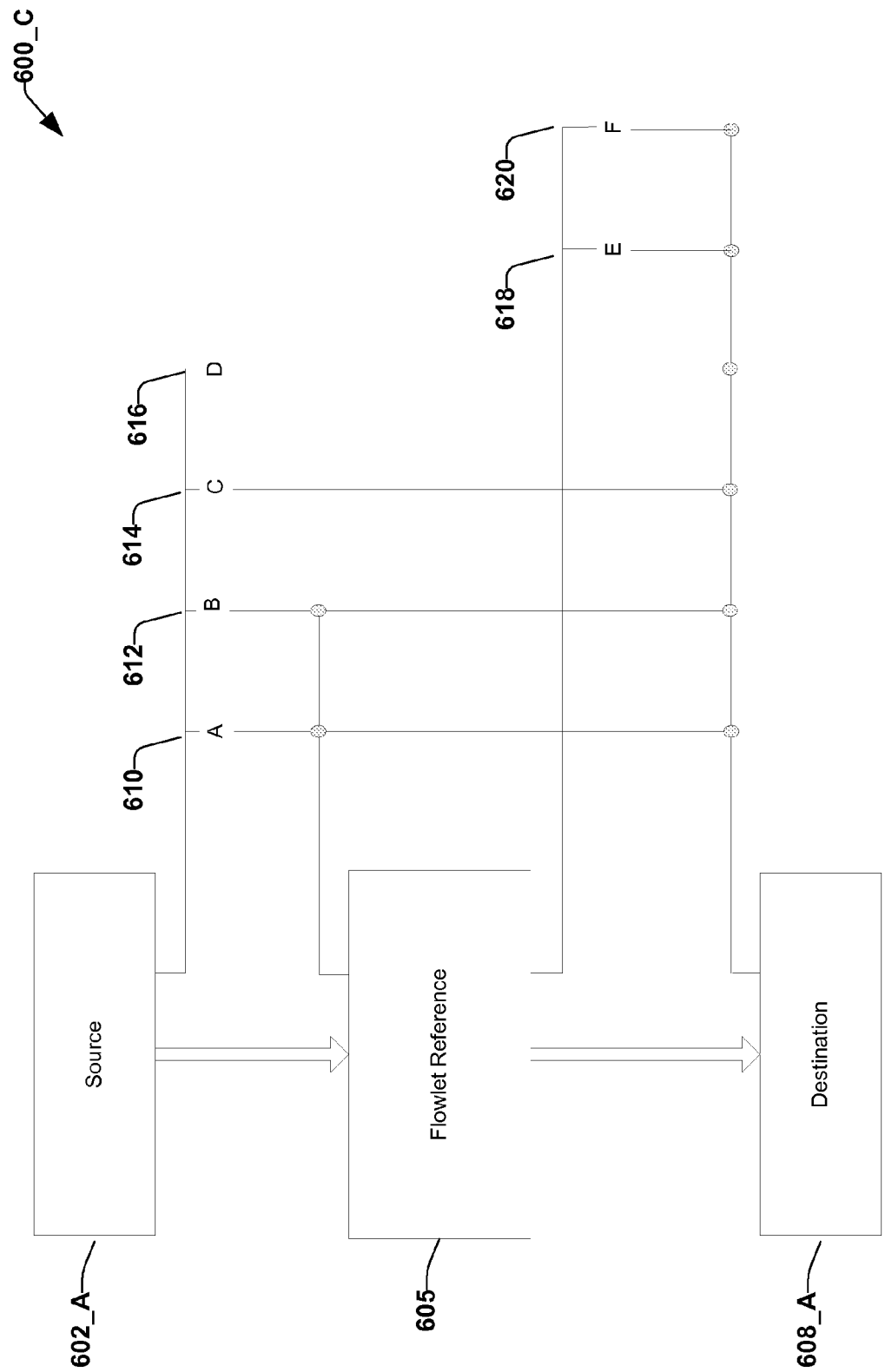
FIG. 6C illustrates an exemplary Flowlet Reference component 605 formed by the extracted components of FIG. 6A according to the process of FIG. 5B.
Figure 6D:
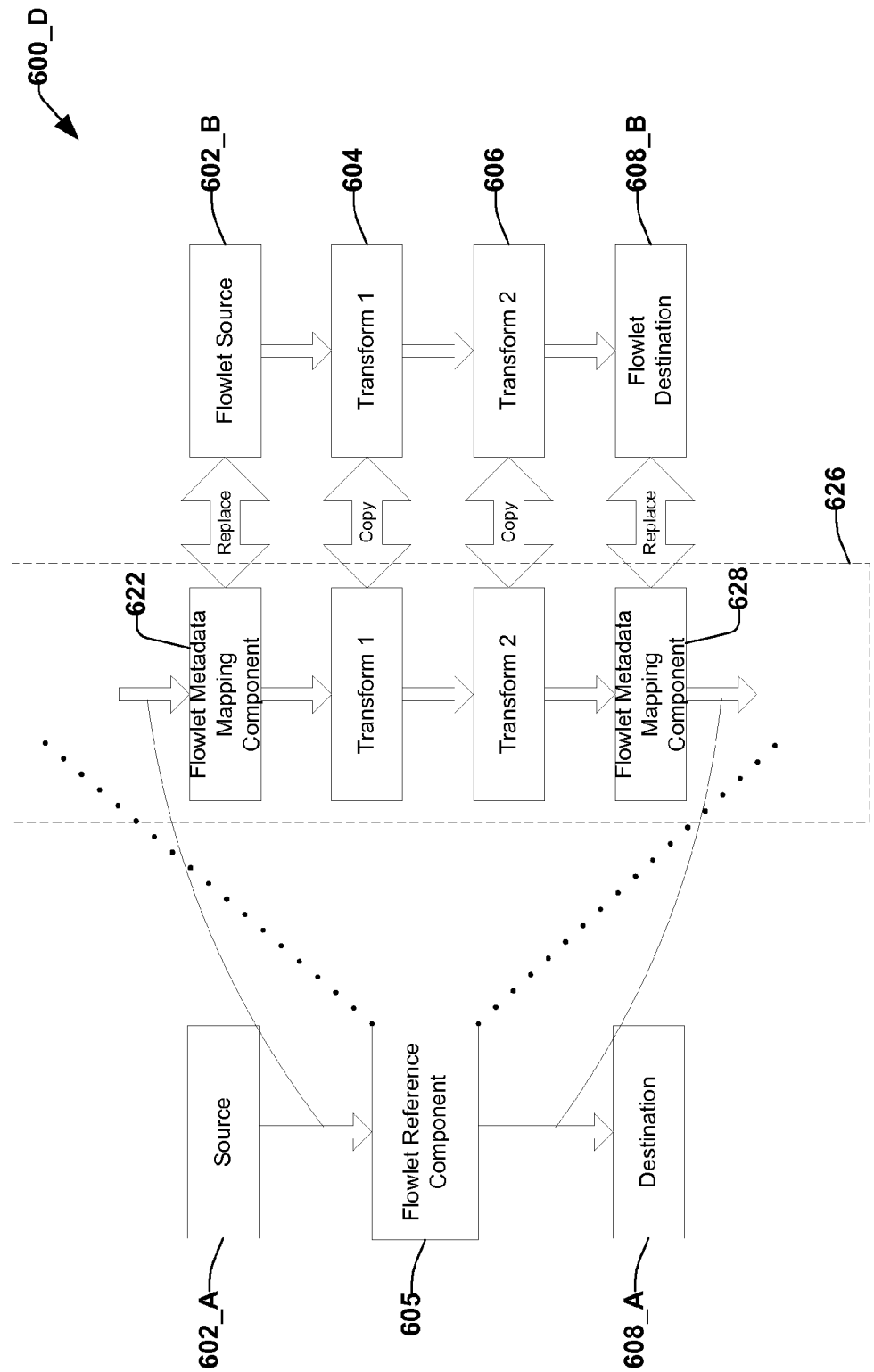
FIG. 6D is an exemplary non-limiting block diagram illustrating that internal flowlet logic can be cached in the case of an Flowlet Reference component formed by extracted components according to one aspect of the invention.

FIG. 6D illustrates how internal flowlet logic can be cached in the case of an exemplary Flowlet Reference component formed by extracted components as in the case of the example in FIGS. 6A-6C. All the cached components can be stored in a private container 626 assigned to the flowlet reference. Both the Flowlet Source 602_B and the Flowlet Destination 608_B can be replaced by the Flowlet Metadata Mapping Components (622 and 628), and the rest of the components (604 and 606) can be copied and appropriately connected. The Flowlet Source can be turned into the mapping component by copying the output columns and replicating them into external metadata column collection on the input. The links between external and output columns can be preserved thereby. The input column collection can be made available for referencing upstream columns and mapping them to available external metadata columns. The Flowlet Destination can be turned into the mapping component by copying the entire input columns and external metadata column collections and then replicating the external metadata columns into the output column collection. The mapping between external metadata and output columns can be preserved the in the same manner as for the case of the mapping component representing a Flowlet Source.

The states of the other (regular) components (604 and 606) copied from the flowlet definition can be copied from the flowlet definition with the exception of object IDs that are to be regenerated. The ID references, inside the scope of cached flowlet objects, are updated as well to use the newly generated IDs.

According to a further aspect of the invention, caching internal flowlet logic by the hosting data flows can optionally be cached only once while persisting the loaded flowlet internals in the hosting package, cached initially but refreshed when the original gets changed, or not cached with flowlet internals always loaded just before execution.

Execution of Data Flows Using Flowlets

According to one aspect of the invention, a flowlet that is referenced in a hosting data flow behaves as a single component to manipulate the data according to the operations or steps defined by its inner logic. Advantageously, this does not require a separate data flow execution engine in SSIS that is responsible for flowlets. As a result, the invention provides the mechanism for flowlets to be incorporated to the main data flow in order to be executed. Thus the execution paths can include the inner flowlet components. Thus, the final update of object IDs that are used to map columns with their upstream origins can be based on the information contained in the metadata mapping components that separate inner and outer components.

As described above, execution paths are entities that define flowing of data in SSIS data flows. Execution paths start at outputs that can produce data (e.g., sources) and end at inputs that consume the data (e.g., destinations). They also include all synchronous input-output pairs that only pass the data through.

Figure 7A:
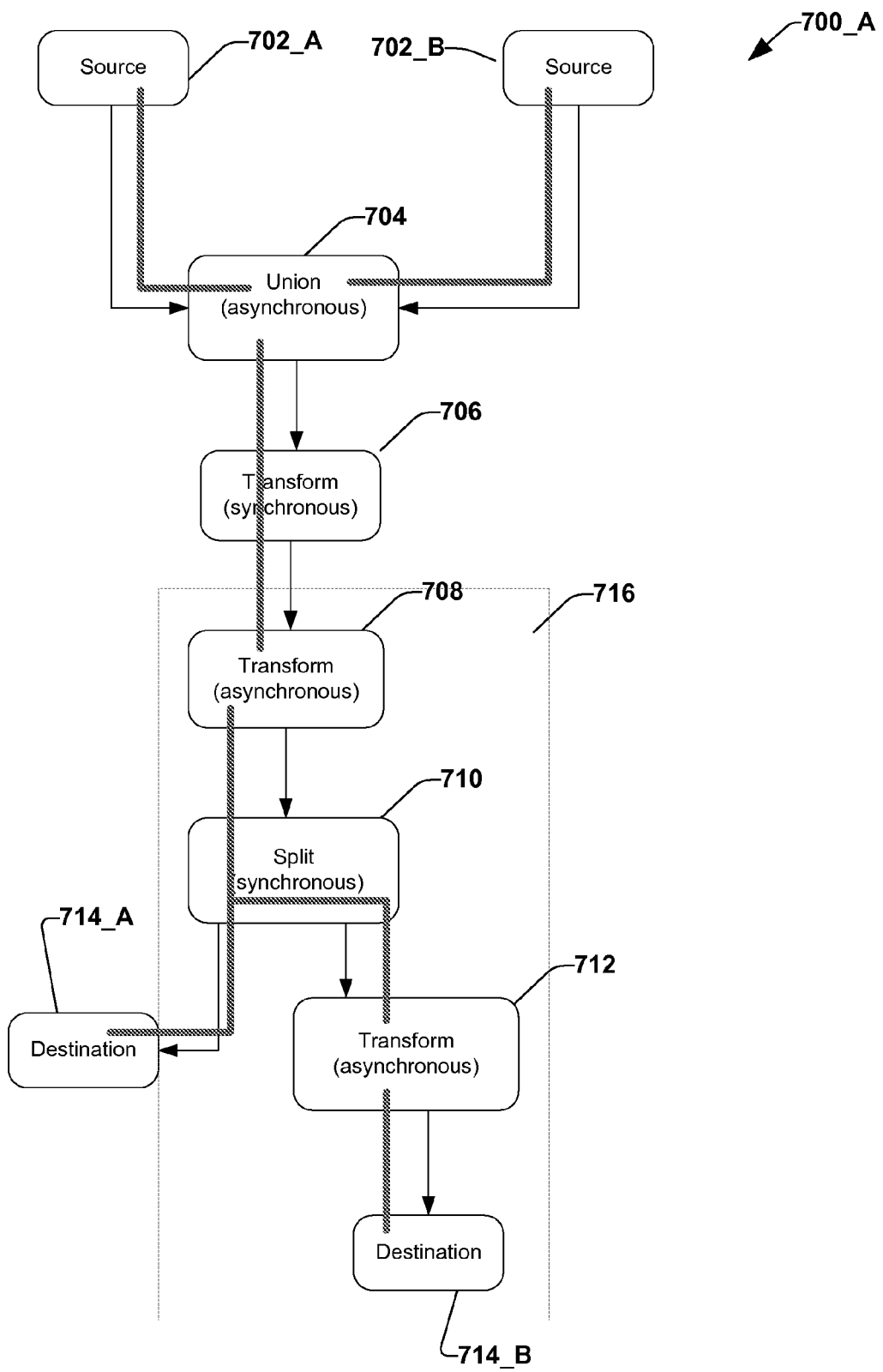
FIG. 7A illustrates an exemplary SSIS Data Flow graph and execution paths that can be produced according to one aspect of the invention.

FIG. 7A illustrates an exemplary SSIS Data Flow graph 700_A and the execution paths it produces. According to one aspect of the invention, sources 702_ start the execution paths, asynchronous components (704, 708, 712) break incoming paths and start new for each asynchronous output, synchronous transforms (706, 710) are inside the path, and destinations 714_ terminate the paths. Additionally, the execution paths are illustrated by lines defining buffers (shown as bold lines in FIGS. 7A-7D). Accordingly, sources generate new buffers, synchronous components process those buffers and pass them thru, asynchronous components (in the general case) collect all the incoming buffers and then generate new ones and destinations only consume incoming buffers.

According to one aspect of the invention, the introduction of flowlets does not change the process of data flow logic. Rather all necessary information about the flowlet to be extracted (716) can be collected before beginning the process of building of execution paths, to be able to integrate inner flowlet logic into the execution paths the same way as if that logic is contained in the main data flow.

Figure 7B:
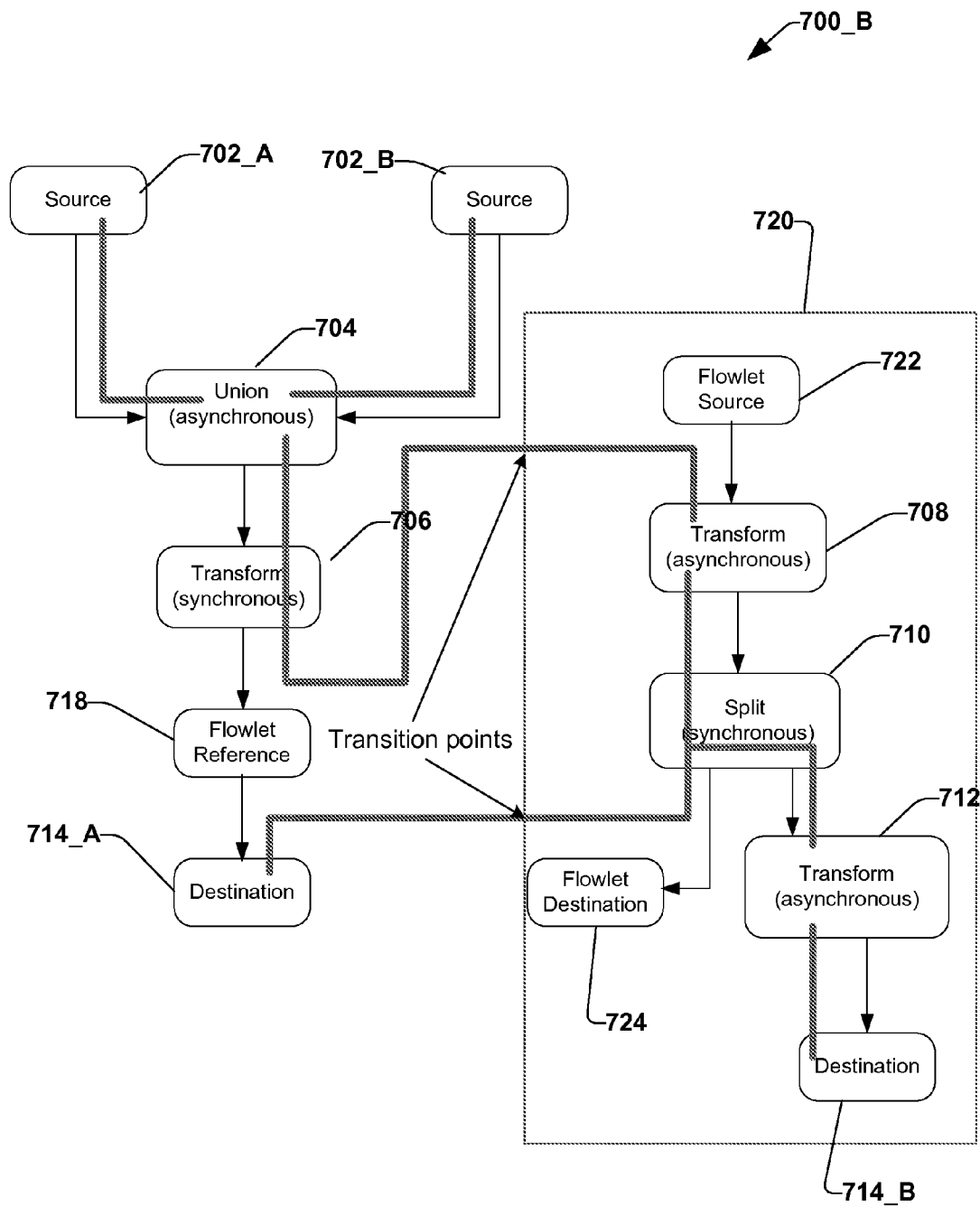
FIG. 7B illustrates how exemplary execution paths can be built for the SSIS Data Flow graph of FIG. 7A after the desired flowlet logic is extracted.

FIG. 7B illustrates how exemplary execution paths are built for the SSIS Data Flow graph 700_A of FIG. 7A after the desired flowlet logic (716) is extracted and the flowlet definition 720 is created.

Figure 7C:
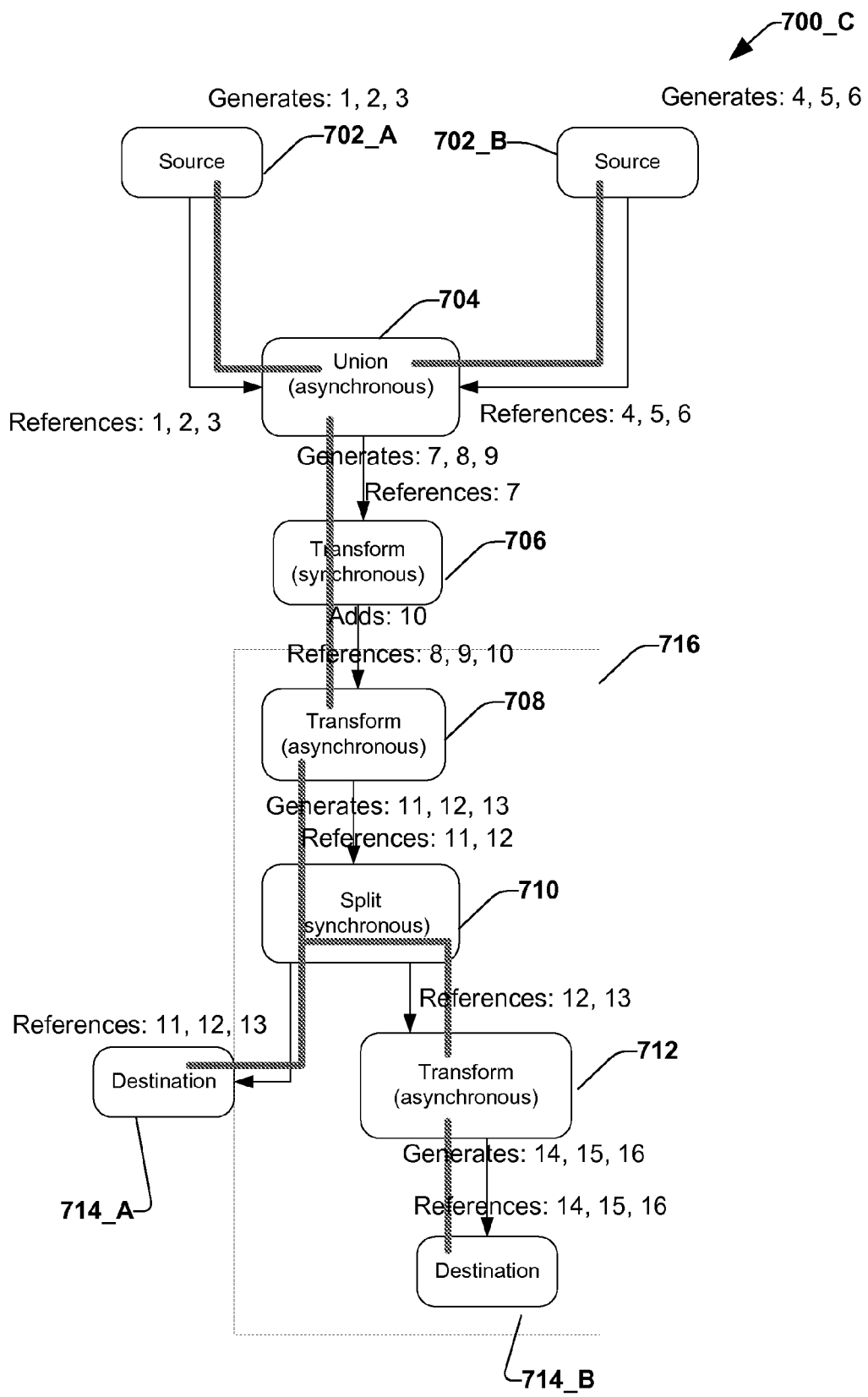
FIGS. 7C and 7D illustrates an example of how columns (and buffers) can be generated, referenced, and mapped when switching to and from the flowlet boundaries of FIGS. 7A and 7B.
Figure 7D:
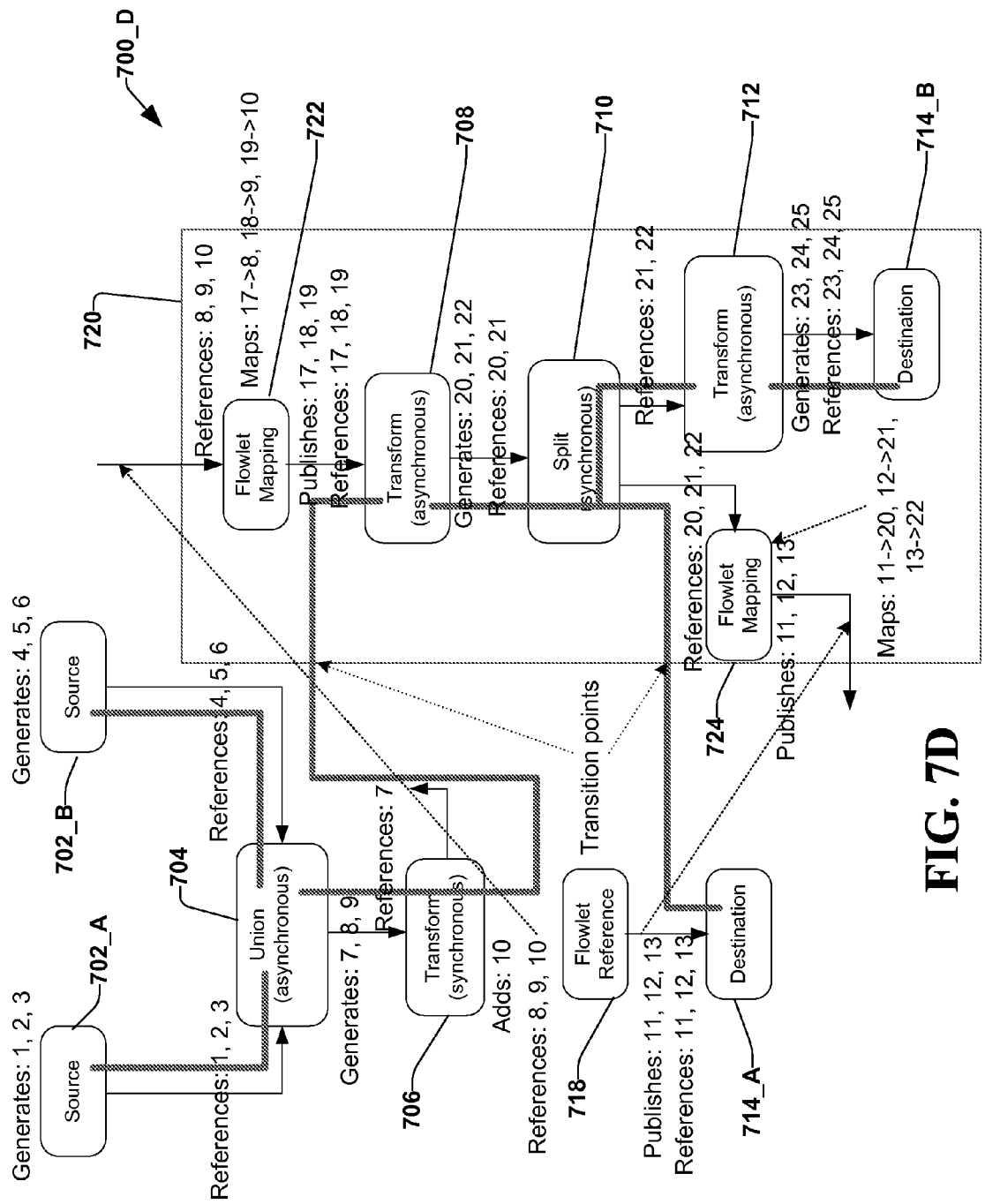

FIGS. 7C and 7D illustrates an example of how columns (and buffers) can be generated, referenced, and mapped when switching to and from the flowlet boundaries of FIGS. 7A and 7B. According to one aspect of the invention, column Lineage IDs can be used to map SSIS data flow columns referenced (e.g., input columns) in given components with their origins (e.g., output columns) generated upstream. These IDs can be assigned to the output columns when they are generated, and, accordingly, the IDs should be unique so they can be used as column identifiers.

After loading flowlet logic into the context of a hosting data flow, the system can translate column lineage IDs (and all other object IDs) into an empty space (e.g., not previously used IDs) so they do not conflict with already used IDs. As a result, the inner IDs on flowlet metadata mapping components are updated so that the inner/outer column mappings are in sync with these changes.

As described above, flowlet mapping components can be enumerated and the table of column lineage ID aliases can be built while building the execution trees. After finishing the generation of execution trees, the SSIS data flow execution scheduler can enumerate all the columns and assign lineage IDs to column positions in assigned buffer definitions for each component. The previously built table of lineage ID aliases can be used to find appropriate upstream columns for the case where mapped column lineages pass at least one flowlet metadata mapping isolation point.

Debugging and Support of Data Flows Using Flowlets

According to a further aspect of the invention, the debugging experience, when data flows containing flowlets are executed, is similar to the experience with debugging regular data flows. Progress can be reported and data viewers can be attached on visible paths. According to a further aspect of the invention, flowlet reference components can be colored to represent execution state of inner components it encapsulates. For example, no color change (e.g., white) can indicate that none of the inner components have started execution, yellow can indicate that at least one component started the execution and there is at least one component which have not finished the execution, green can indicate that all inner components have finished the execution, and red can indicate that there is at least one inner component which failed in execution. The selections of such debugging indications are described to illustrate exemplary choices of debugging options available and are not crucial to the functionality of the invention.

According to a further aspect of the invention, the data flow developer can be presented with debugging information even inside the flowlets. Such information can be provided by passing the progress information to opened flowlet designers and implementing the same debugging visual features in the provided designer as for a regular data flow. Flowlet references behave as single components in main data flows during the execution in the designer. The progress events and data viewers can offer an external view to the flowlets referenced in the main data flow. The flowlet definition designer can be opened from the place it is referenced in a main flow and internal progress messages can be channeled to it and displayed at the granularity of a single component contained by the flowlet. According to a further aspect of the invention, it possible to define data viewers inside flowlet definition diagrams. As a result, when the execution flow gets inside the flowlet internals, a flowlet can start coloring and show progress and data viewers for respective components presented in the flowlet definition designer, for example, when opened in a separate window.

According to a further aspect of the invention, error messages, logging information, and other events generated by the inner flowlet components can also be routed to the appropriate flowlet reference component and then filtered or aggregated as necessary to further enrich the development and debugging experience. For example, components defined in flowlets can be loaded into a main data flows for the execution and as such can pass associated logging information to the log providers defined in the main data flow. According to a further aspect of the invention log information emitted by components inside of referenced flowlets can be extended to identify both the flowlet reference component and its inner component.

According to a further aspect of the invention, standard data flow events can be raised by data flow components such as, information, warning, error, progress, custom event, and query cancel Information, warning and error events can be used for diagnostics of validation, execution and other actions. The progress event can be used to report the progress of execution stages (e.g., number of components in a data flow that are validated, prepared for execution, etc.). The custom event can be used to report all other events not covered by the previous four, but most importantly it reports progress of data as it moves in buffers. Query cancel can be used to poll the client whether the execution should be canceled. These events can be used by the data flow developer, for example to display messages associated with the components that emitted them, to display progress in a progress view, to show number of rows flowing through paths, and to color components as they go through execution phases or encounter errors as described above.

According to a further aspect of the invention, for some flowlet reference components introduced in data flows, some of these events can be enabled to carry additional information. For example, such additional information may identify a flowlet reference together with its inner component that generated an event. Additionally, the capability to define the logic to filter or aggregate some of the events raised by the inner components of flowlet definitions can be provided to further enhance the data flow development experience using flowlets.

Deployment of Data Flow Packages Using Flowlets

According to a further aspect of the invention, deployment utilities can be provided to cover packages that reference flowlets and to be able to deploy flowlets on their own. Some exemplary deployments scenarios may include deploying flowlet definitions to a common location so they can be referenced from multiple places, deploying packages that reference flowlets without used flowlets (e.g., in the case where flowlet logic is already cached in main packages), deploying packages together with used flowlets, and deploying flowlet definitions only. For example, if the project to be deployed contains only flowlet definitions it may be possible to deploy all those flowlets to a single location. The flowlets can be deployed the same way that packages are deployed currently with the exception of a different destination table (e.g., a msdb database) if flowlets are moved to SQL Server.

Furthermore, if a deployed project contains both package and flowlet items in their folders, all of them can be deployed. A separate destination pages on a deployment wizard can be provided to specify flowlet and package destination server or folder. As a further illustration, the deployment logic can follow the steps of going through the entire package to look for the flowlet reference components, get to the connection managers (e.g., File and SQL Server connections) used to define locations of flowlet definitions from the list of flowlet reference components, build a list of unique flowlet definitions from the connection managers pointing to files, find those among the flowlet definitions identified in the last step that are already cached to the main flow in all instances where they are referenced, offer this list in the wizard grid so users can choose which ones to deploy with associated packages, show the rest of the list as flowlets that will also be deployed, and the go through the list of flowlet definitions to be deployed and update connections managers pointing to them in the main package. Note that flowlets published to SQL Server do not need to be moved as their references will not be broken.

Storage and Management of Flowlet Definitions

According to a further aspect of the invention, flowlet definitions can be saved to three types of storage (e.g., files, dedicated table in the SQL Server system database, and SSIS Storage) just as for regular SSIS packages. Moreover, flowlet browsing capability can be provided in the provided SSIS designer as well as to other relevant clients.

Additionally, the invention provides the possibility to choose among multiple ways to protect flowlet definitions. For example, a data flow developer can choose to not save sensitive data, encrypt sensitive data with user key or password, encrypt all data with user key or password, or rely on server storage and roles for access control. Accordingly, the default flowlet definition protection can be to encrypt sensitive data with user key. As a result, only the same user would be allowed to load the package in whole and a different user will see blanks replacing the sensitive information and fail to execute the package. Similarly, the encrypt all data with user key provides that a different user will not be able to open the package at all. Such options can rely on the function EncryptStringWithUserKey from MICROSOFT Data Protection API (DPAPI) to do the encryption or other equivalent encryption APIs or functionality. As an example, if the protection level is set to encrypt sensitive data with password, a screen asking for password can be provided when a user opens a package. Failing to provide a correct password causes the package to open without sensitive data loaded and the package will not be executed. Similarly, if the protection level is set to encrypt all data with password, a user is unable to open or execute the data if correct password is not entered appropriately. Lastly, a protection level set to rely on server storage and roles for access control protects a package with database-level roles only when a package is saved to SQL database.

Exemplary Networked and Distributed Environments

One of ordinary skill in the art can appreciate that the invention can be implemented in connection with any computer or other client or server device, which can be deployed as part of a computer network, or in a distributed computing environment, connected to any kind of data store. In this regard, the present invention pertains to any computer system or environment having any number of memory or storage units, and any number of applications and processes occurring across any number of storage units or volumes, which may be used in connection with modularizing data flows or providing stand-alone execution of incomplete data flows in accordance with the present invention. The present invention may apply to an environment with server computers and client computers deployed in a network environment or a distributed computing environment, having remote or local storage. The present invention may also be applied to standalone computing devices, having programming language functionality, interpretation and execution capabilities for generating, receiving and transmitting information in connection with remote or local services and processes. Modularizing data flows or providing stand-alone execution of incomplete data flows and the related techniques in accordance with the present invention can be applied with great efficacy in those environments.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the systems and methods for modularizing data flows or providing stand-alone execution of incomplete data flows according to the disclosed invention.

Figure 8:
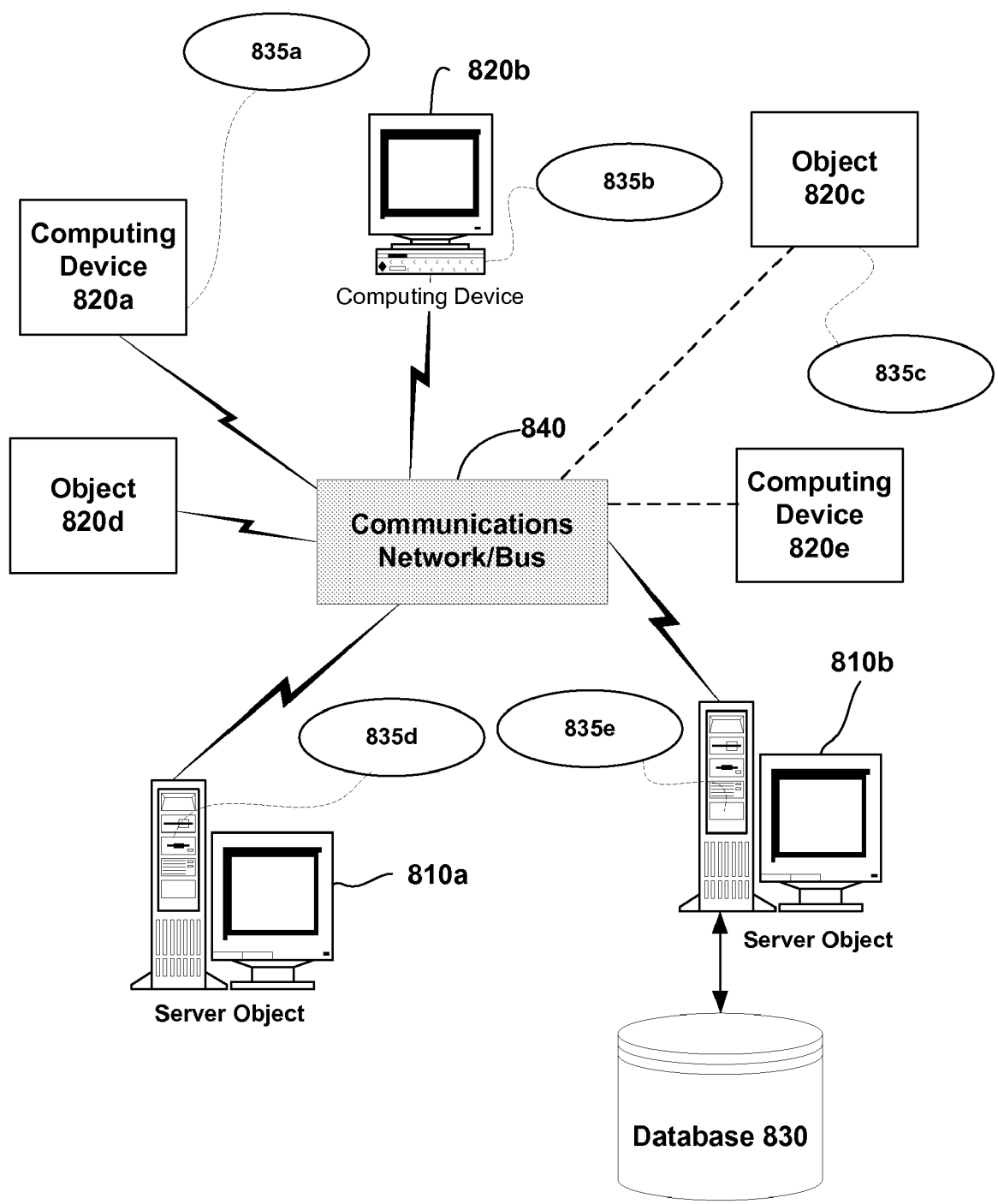
FIG. 8 is a block diagram representing an exemplary non-limiting networked environment in which the present invention may be implemented.

FIG. 8 provides a schematic diagram of an exemplary networked or distributed computing environment. The distributed computing environment comprises computing objects 810a, 810b, etc. and computing objects or devices 820a, 820b, 820c, 820d, 820e, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 840. This network may itself comprise other computing objects and computing devices that provide services to the system of FIG. 8, and may itself represent multiple interconnected networks. In accordance with an aspect of the invention, each object 810a, 810b, etc. or 820a, 820b, 820c, 820d, 820e, etc. may contain an application that might make use of an API, or other object, software, firmware and/or hardware, suitable for use with the systems and methods for modularizing data flows or providing stand-alone execution of incomplete data flows in accordance with the invention.

It can also be appreciated that an object, such as 820c, may be hosted on another computing device 810a, 810b, etc. or 820a, 820b, 820c, 820d, 820e, etc. Thus, although the physical environment depicted may show the connected devices as computers, such illustration is merely exemplary and the physical environment may alternatively be depicted or described comprising various digital devices such as PDAs, televisions, MP3 players, etc., any of which may employ a variety of wired and wireless services, software objects such as interfaces, COM objects, and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to modularizing data flows or providing stand-alone execution of incomplete data flows according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, any of the computing devices of the present invention may share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, e.g., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 8, as an example, computers 820a, 820b, 820c, 820d, 820e, etc. can be thought of as clients and computers 810a, 810b, etc. can be thought of as servers where servers 810a, 810b, etc. maintain the data that is then replicated to client computers 820a, 820b, 820c, 820d, 820e, etc., although any computer can be considered a client, a server, or both, depending on the circumstances. Any of these computing devices may be processing data or requesting services or tasks that may implicate the systems and methods for modularizing data flows or providing stand-alone execution of incomplete data flows in accordance with the invention.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for modularizing data flows or providing stand-alone execution of incomplete data flows of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 8 illustrates an exemplary networked or distributed environment, with server(s) in communication with client computer (s) via a network/bus, in which the present invention may be employed. In more detail, a number of servers 810a, 810b, etc. are interconnected via a communications network/bus 840, which may be a LAN, WAN, intranet, GSM network, the Internet, etc., with a number of client or remote computing devices 820a, 820b, 820c, 820d, 820e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to modularize data flows or provide stand-alone execution of incomplete data flows.

In a network environment in which the communications network/bus 840 is the Internet, for example, the servers 810a, 810b, etc. can be Web servers with which the clients 820a, 820b, 820c, 820d, 820e, etc. communicate via any of a number of known protocols such as HTTP. Servers 810a, 810b, etc. may also serve as clients 820a, 820b, 820c, 820d, 820e, etc., as may be characteristic of a distributed computing environment.

As mentioned, communications may be wired or wireless, or a combination, where appropriate. Client devices 820a, 820b, 820c, 820d, 820e, etc. may or may not communicate via communications network/bus 14, and may have independent communications associated therewith. For example, in the case of a TV or VCR, there may or may not be a networked aspect to the control thereof. Each client computer 820a, 820b, 820c, 820d, 820e, etc. and server computer 810a, 810b, etc. may be equipped with various application program modules or objects 135a, 135b, 135c, etc. and with connections or access to various types of storage elements or objects, across which files or data streams may be stored or to which portion(s) of files or data streams may be downloaded, transmitted or migrated. Any one or more of computers 810a, 810b, 820a, 820b, 820c, 820d, 820e, etc. may be responsible for the maintenance and updating of a database 830 or other storage element, such as a database or memory 830 for storing data processed or saved according to the invention. Thus, the present invention can be utilized in a computer network environment having client computers 820a, 820b, 820c, 820d, 820e, etc. that can access and interact with a computer network/bus 840 and server computers 810a, 810b, etc. that may interact with client computers 820a, 820b, 820c, 820d, 820e, etc. and other like devices, and databases 830.

Exemplary Computing Device

Figure 9:
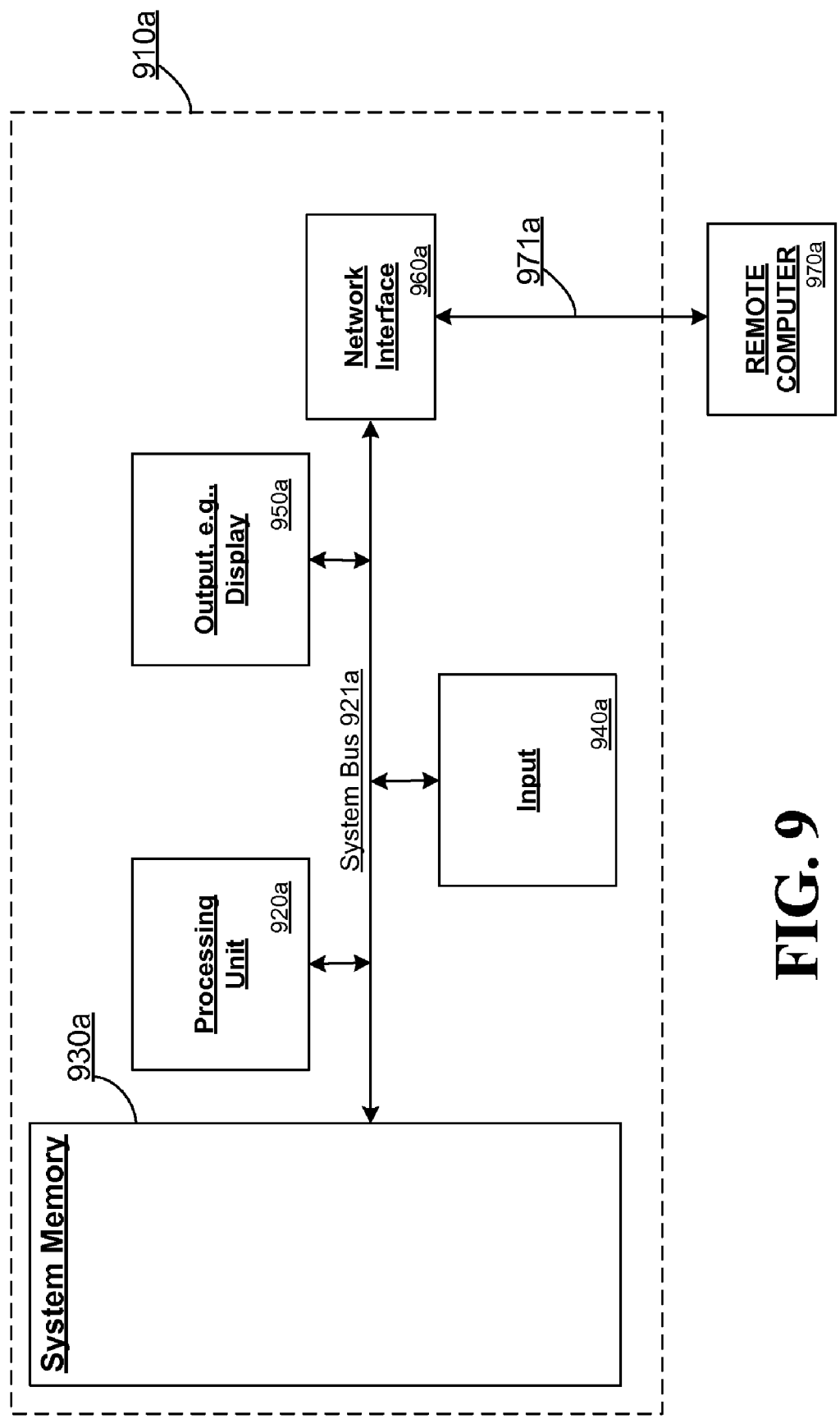
FIG. 9 is a block diagram representing an exemplary non-limiting computing system or operating environment in which the present invention may be implemented.

As mentioned, the invention applies to any device wherein it may be desirable to modularize data flows or provide stand-alone execution of incomplete data flows. It should be understood, therefore, that handheld, portable and other computing devices and computing objects of all kinds are contemplated for use in connection with the present invention. Accordingly, the below general purpose remote computer described below in FIG. 9 is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 9 thus illustrates an example of a suitable computing system environment 900a in which the invention may be implemented, although as made clear above, the computing system environment 900a is only one example of a suitable computing environment for a media device and is not intended to suggest any limitation as to the scope of use or functionality of the invention. Neither should the computing environment 900a be interpreted as having any dependency or requirement relating to any one or combination of components illustrated in the exemplary operating environment 900a.

With reference to FIG. 9, an exemplary remote device for implementing the invention includes a general purpose computing device in the form of a computer 910a. Components of computer 910a may include, but are not limited to, a processing unit 920a, a system memory 930a, and a system bus 921a that couples various system components including the system memory to the processing unit 920a. The system bus 921a may be any of several types of bus structures including a memory bus or memory controller, a peripheral bus, and a local bus using any of a variety of bus architectures.

Computer 910a typically includes a variety of computer readable media. Computer readable media can be any available media that can be accessed by computer 910a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 910a. Communication media typically embodies computer readable instructions, data structures, program modules or other data in a modulated data signal such as a carrier wave or other transport mechanism and includes any information delivery media.

The system memory 930a may include computer storage media in the form of volatile and/or nonvolatile memory such as read only memory (ROM) and/or random access memory (RAM). A basic input/output system (BIOS), containing the basic routines that help to transfer information between elements within computer 910a, such as during start-up, may be stored in memory 930a. Memory 930a typically also contains data and/or program modules that are immediately accessible to and/or presently being operated on by processing unit 920a. By way of example, and not limitation, memory 930a may also include an operating system, application programs, other program modules, and program data.

The computer 910a may also include other removable/non-removable, volatile/nonvolatile computer storage media. For example, computer 910a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 921a through a non-removable memory interface such as an interface, and a magnetic disk drive or optical disk drive is typically connected to the system bus 921a by a removable memory interface, such as an interface.

A user may enter commands and information into the computer 910a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 920a through user input 940a and associated interface(s) that are coupled to the system bus 921a, but may be connected by other interface and bus structures, such as a parallel port, game port or a universal serial bus (USB). A graphics subsystem may also be connected to the system bus 921a. A monitor or other type of display device is also connected to the system bus 921a via an interface, such as output interface 950a, which may in turn communicate with video memory. In addition to a monitor, computers may also include other peripheral output devices such as speakers and a printer, which may be connected through output interface 950a.

The computer 910a may operate in a networked or distributed environment using logical connections to one or more other remote computers, such as remote computer 970a, which may in turn have media capabilities different from device 910a. The remote computer 970a may be a personal computer, a server, a router, a network PC, a peer device or other common network node, or any other remote media consumption or transmission device, and may include any or all of the elements described above relative to the computer 910a. The logical connections depicted in FIG. 9 include a network 971a, such local area network (LAN) or a wide area network (WAN), but may also include other networks/buses. Such networking environments are commonplace in homes, offices, enterprise-wide computer networks, intranets and the Internet.

When used in a LAN networking environment, the computer 910a is connected to the LAN 971a through a network interface or adapter. When used in a WAN networking environment, the computer 910a typically includes a communications component, such as a modem, or other means for establishing communications over the WAN, such as the Internet. A communications component, such as a modem, which may be internal or external, may be connected to the system bus 921a via the user input interface of input 940a, or other appropriate mechanism. In a networked environment, program modules depicted relative to the computer 910a, or portions thereof, may be stored in a remote memory storage device. It will be appreciated that the network connections shown and described are exemplary and other means of establishing a communications link between the computers may be used.

Exemplary Distributed Computing Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, e.g., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software, such as an application programming interface (API), residing on a computing device, one or more portions of the invention may also be implemented via an operating system, or a "middle man" object, a control object, hardware, firmware, intermediate language instructions or objects, etc., such that the methods for modularizing data flows or providing stand-alone execution of incomplete data flows in accordance with the invention may be included in, supported in or accessed via all of the languages and services enabled by managed code, such as .NET code, and in other distributed computing frameworks as well.

There are multiple ways of implementing the present invention, e.g., an appropriate API, tool kit, driver code, operating system, control, standalone or downloadable software object, etc. which enables applications and services to use the systems and methods for modularizing data flows or providing stand-alone execution of incomplete data flows of the invention. The invention contemplates the use of the invention from the standpoint of an API (or other software object), as well as from a software or hardware object that modularizes data flows or provides stand-alone execution of incomplete data flows in accordance with the invention. Thus, various implementations of the invention described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the present invention have been described in connection with various computing devices and network architectures, the underlying concepts may be applied to any computing device or system in which it is desirable to modularize data flows or provide stand-alone execution of incomplete data flows. For instance, some of the components of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (e.g., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the methods or components of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of FIGS. 1-7. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any language to provide methods for modularizing data flows or providing stand-alone execution of incomplete data flows. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A computer-implemented method for executing an incomplete data flow comprising:
   identifying an incomplete SQL Server Integration Services (SSIS) data flow having at least one missing or unknown source point, destination point or operation which must be accounted for before the incomplete SSIS data flow can be executed;
   providing one or more data flowlet components, each of the data flowlet components having an associated flowlet definition, flowlet internals, and one or more of inputs and outputs;
   connecting the data flowlet component to the incomplete SSIS data flow in place of the at least one missing or unknown source point, destination point or operation;
   providing a flowlet reference component configured to link the one or more flowlet definitions to one or more external data flows, each one or more external data flow having one or more of inputs and outputs;
   providing a flowlet metadata mapping component configured to map at least one of the inputs or outputs of the one or more external data flows by mapping at least one of the inputs or outputs of the one or more of the data flowlet components to the flowlet reference component; and
   executing the incomplete SSIS data flow using a package component, wherein the incomplete SSIS data flow that is executed has been modified to now include the data flowlet component in place of the at least one missing or unknown source point, destination point or operation.

2. The method of claim 1, wherein providing one or more data flowlet components includes providing a source flowlet component which operates as a functional data source in the incomplete data flow, the source flowlet having one or more outputs.

3. The method of claim 1, wherein providing one or more data flowlet components includes providing a destination flowlet component which operates as a functional data destination in the incomplete data flow, the destination flowlet having one or more inputs.

4. The method of claim 1, wherein providing one or more data flowlet components includes providing an operation flowlet component for an unknown operation.

5. The method of claim 1, wherein providing one or more data flowlet components includes selecting one or more previously defined data flowlet components from a library of reusable data flowlet components.

6. The method of claim 1, further comprising:
   debugging the incomplete data flow using a debugging component configured to provide at least one of monitoring, indication, logging, and feedback capabilities.

7. The method of claim 1, wherein the flowlet reference component is further configured to provide an interface for providing services to load and cache flowlet internals, refresh loaded flowlet internals, and persist flowlet internals.

8. The method of claim 1, further comprising:
   integrating the incomplete data flow into an existing data flow layout architecture to preserve one or more of existing objects and interfaces.

9. A computer readable storage medium comprising stored computer executable instructions which, when executed by a computing system, implement a method comprising:
   identifying an incomplete SQL Server Integration Services (SSIS) data flow having at least one missing or unknown source point, destination point or operation which must be accounted for before the incomplete SSIS data flow can be executed;
   providing one or more data flowlet components, each of the data flowlet components having an associated flowlet definition, flowlet internals, and one or more of inputs and outputs;
   connecting the data flowlet component to the incomplete SSIS data flow in place of the at least one missing or unknown source point, destination point or operation;
   providing a flowlet reference component configured to link the one or more flowlet definitions to one or more external data flows, each one or more external data flow having one or more of inputs and outputs;
   providing a flowlet metadata mapping component configured to map at least one of the inputs or outputs of the one or more external data flows by mapping at least one of the inputs or outputs of the one or more of the data flowlet components to the flowlet reference component; and
   executing the incomplete SSIS data flow using a package component, wherein the incomplete SSIS data flow that is executed has been modified to now include the data flowlet component in place of the at least one missing or unknown source point, destination point or operation.

10. A computing device comprising a processor and memory storing computer-executable instructions which, when executed by the processor, implement a method comprising:
    identifying an incomplete SQL Server Integration Services (SSIS) data flow having at least one missing or unknown source point, destination point or operation which must be accounted for before the incomplete SSIS data flow can be executed;
    providing one or more data flowlet components, each of the data flowlet components having an associated flowlet definition, flowlet internals, and one or more of inputs and outputs;
    connecting the data flowlet component to the incomplete SSIS data flow in place of the at least one missing or unknown source point, destination point or operation;
    providing a flowlet reference component configured to link the one or more flowlet definitions to one or more external data flows, each one or more external data flow having one or more of inputs and outputs;
    providing a flowlet metadata mapping component configured to map at least one of the inputs or outputs of the one or more external data flows by mapping at least one of the inputs or outputs of the one or more of the data flowlet components to the flowlet reference component; and
    executing the incomplete SSIS data flow using a package component, wherein the incomplete SSIS data flow that is executed has been modified to now include the data flowlet component in place of the at least one missing or unknown source point, destination point or operation.

* * * * *